US012167004B2

(12) United States Patent
Hu et al.

(10) Patent No.: US 12,167,004 B2
(45) Date of Patent: Dec. 10, 2024

(54) IMAGE TRANSMISSION METHOD AND APPARATUS

(71) Applicant: HUAWEI TECHNOLOGIES CO., LTD., Guangdong (CN)

(72) Inventors: Cui Hu, Shanghai (CN); Jingwei Chen, Shenzhen (CN); Liang Chen, Shanghai (CN); Juanpeng He, Shenzhen (CN); Shuo Lian, Shenzhen (CN); Shuangquan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 17/897,808

(22) Filed: Aug. 29, 2022

(65) Prior Publication Data
US 2023/0007282 A1      Jan. 5, 2023

Related U.S. Application Data

(63) Continuation of application No. PCT/CN2020/077260, filed on Feb. 28, 2020.

(51) Int. Cl.
*H04N 19/30* (2014.01)
*H04N 19/136* (2014.01)
(Continued)

(52) U.S. Cl.
CPC .......... *H04N 19/30* (2014.11); *H04N 19/136* (2014.11); *H04N 19/172* (2014.11); *H04N 19/436* (2014.11)

(58) Field of Classification Search
None
See application file for complete search history.

(56) References Cited

U.S. PATENT DOCUMENTS

2018/0174275 A1    6/2018   Bourdev et al.

FOREIGN PATENT DOCUMENTS

CN    101345870 A    1/2009
CN    101799919 A    8/2010
(Continued)

OTHER PUBLICATIONS

Haisheng Fu et al., Improved Hybrid Layered Image Compression Using Deep Learning and Traditional Codecs, Signal Processing, Image Communication, Elsevier Science Publishers, Amsterdam, NL, Jan. 7, 2020, XP086001289, 10 pages.
(Continued)

*Primary Examiner* — Dakshesh D Parikh
(74) *Attorney, Agent, or Firm* — James Harrison

(57) ABSTRACT

Embodiments of this application provide an image transmission method and apparatus. The method includes: converting a first high-resolution image into a first low-resolution image, where first resolution of the first high-resolution image is higher than second resolution of the first low-resolution image; encoding the first low-resolution image to obtain a first bitstream; obtaining a second high-resolution image, where third resolution of the second high-resolution image is higher than the second resolution, and the second high-resolution image includes high-frequency information of the first high-resolution image and excludes low-frequency information of the first high-resolution image; obtaining an image residual between the first high-resolution image and the second high-resolution image, where the image residual is used to reflect the low-frequency information of the first high-resolution image; encoding the image residual to obtain a second bitstream; and sending the first bitstream and the second bitstream.

20 Claims, 10 Drawing Sheets

(51) Int. Cl.
    *H04N 19/172*     (2014.01)
    *H04N 19/436*     (2014.01)

(56) References Cited

FOREIGN PATENT DOCUMENTS

| | | | |
|---|---|---|---|
| CN | 106162180 A | 11/2016 | |
| CN | 108076301 A | 5/2018 | |
| CN | 109451323 A | 3/2019 | |
| KR | 20200056943 A | * 5/2020 | ............. H04N 19/20 |

OTHER PUBLICATIONS

Juan Wang et al., Semantic Perceptual Image Compression With a Laplacian Pyramid of Convolutional Networks, IEEE, Sep. 22, 2019, XP033642159, 5 pages.

Li Yue et al: "Learning a Convolutional Neural Network for Image Compact-Resolution", IEEE, Mar. 1, 2019, XP011703593, 16 pages.

* cited by examiner

IMAGE TRANSMISSION METHOD AND APPARATUS

CROSS-REFERENCE TO RELATED APPLICATIONS

This application is a continuation of International Application No. PCT/CN2020/077260, filed on Feb. 28, 2020, the disclosure of which is hereby incorporated by reference in its entirety.

TECHNICAL FIELD

Embodiments of this application relate to image processing technologies, and in particular, to an image transmission method and apparatus.

BACKGROUND

A video refers to various technologies that capture, record, process, store, transmit, and reproduce a series of static images in a form of electrical signals. Higher resolution of a video indicates higher definition of the video and a larger data amount of the video. Because visual effect of a high-resolution video is more vivid than visual effect of a low-resolution video, to ensure optimal user experience, transmission of a high-resolution video in real time is chosen for increasingly more application scenarios such as network live broadcast, online watching of high-definition videos, and high-definition video conferences.

Currently, when transmitting a high-resolution video, most transmission devices usually encode the high-resolution video before transmitting it. However, a manner in which the high-resolution video is transmitted cannot meet a requirement in actual use. Therefore, how to transmit the high-resolution video is an urgent problem to be resolved.

SUMMARY

Embodiments of this application provide an image transmission method and apparatus, to transmit a high-resolution video.

According to a first aspect, an embodiment of this application provides an image transmission method. The method may be applied to a sender in a transmission system, or may be applied to a chip in the sender. The method in this embodiment of this application is used to resolve a problem that an existing manner of transmitting a high-resolution video causes a large amount of transmitted data of the high-resolution video. Specifically, a first high-resolution image is converted into a first low-resolution image. First resolution of the first high-resolution image is higher than second resolution of the first low-resolution image. The first low-resolution image is encoded to obtain a first bitstream; and a second high-resolution image is obtained. Third resolution of the second high-resolution image is higher than the second resolution, and the second high-resolution image includes high-frequency information of the first high-resolution image and excludes low-frequency information of the first high-resolution image. An image residual between the first high-resolution image and the second high-resolution image is obtained. The image residual is used to reflect the low-frequency information. The image residual is encoded to obtain a second bitstream. The first bitstream and the second bitstream are sent.

It should be understood that the high-frequency information is image detail information and the low-frequency information is image outline information. In the first high-resolution image, the image detail information changes more rapidly than the image outline information.

Optionally, the method may be applied to video transmission, and the first high-resolution image is a frame of image in a video.

According to the image transmission method provided in this embodiment, the sender may decompose, for transmission, the to-be-transmitted high-resolution image into the low-resolution image and the image residual used to reflect the low-frequency information of the high-resolution image. In this embodiment, a data amount of the image residual used to reflect the low-frequency information of the high-resolution image is far less than a data amount of an image residual used to reflect the low-frequency information and the high-frequency information of the high-resolution image. Therefore, a transmission bit rate required for transmitting the image residual used to reflect the low-frequency information of the high-resolution image in this embodiment is greatly reduced compared with a transmission bit rate required for transmitting the image residual used to reflect the low-frequency information and the high-frequency information of the high-resolution image. In other words, an amount of transmitted data is reduced. In addition, a transmission bit rate required for transmitting the low-resolution image is also far less than a transmission bit rate required for transmitting the high-resolution image. Therefore, in this embodiment, a low transmission bit rate may be used to transmit the high-resolution image between the sender and a receiver. When the method is used to transmit the high-resolution video, the high-resolution video can be transmitted at a low transmission bit rate, transmission bit rates supported by most transmission devices can be met, and an application scenario of transmitting the high-resolution video in real time can be met.

In a possible implementation, the obtaining a second high-resolution image may include: decoding the first bitstream to obtain a second low-resolution image; and reconstructing the second high-resolution image by using the second low-resolution image. For example, the second high-resolution image is reconstructed by using the second low-resolution image and a neural network.

In a manner in which the second high-resolution image is obtained by using the decoded second low-resolution image, the second high-resolution image obtained by the sender covers encoding and decoding losses of the first low-resolution image in a transmission process. The image residual obtained by the sender based on the second high-resolution image and the first high-resolution image also covers the encoding and decoding losses of the first low-resolution image in the transmission process. In this way, after obtaining the second high-resolution image based on the second low-resolution image, the receiver may eliminate the loss of the first low-resolution image in the transmission process when combining the second high-resolution image and the image residual obtained through decoding. In this case, only a transmission loss of the image residual exists on a transmission path, a loss of a third high-resolution image restored by the receiver is reduced. This improves image quality.

In a possible implementation, the first resolution and the third resolution are the same, and the obtaining an image residual between the first high-resolution image and the second high-resolution image may include: subtracting a pixel value of a first pixel in the first high-resolution image from a pixel value of a second pixel in the second high-resolution image corresponding to the first pixel, to obtain a first pixel residual in the image residual. Alternatively, the first resolution is higher than the third resolution, and the obtaining an image residual between the first high-resolution image and the second high-resolution image may include: converting the second high-resolution image into a fourth high-resolution image, where the fourth high-resolution image has the first resolution; and subtracting a pixel value of a first pixel in the first high-resolution image from a pixel value of a third pixel in the fourth high-resolution image corresponding to the first pixel, to obtain a second pixel residual in the image residual. In this manner, the image residual may be obtained in a plurality of manners. This expands an application scenario of the solution.

In a possible implementation, the encoding the first low-resolution image may include: encoding the first low-resolution image by using a lossy encoding scheme. In this manner, a transmission bit rate of the first low-resolution image can be reduced, and a transmission bit rate for transmitting the high-resolution image between the sender and the receiver is further reduced.

In a possible implementation, the encoding the image residual may include: encoding the image residual by using the lossy encoding scheme. In this manner, a transmission bit rate of the image residual can be reduced, and the transmission bit rate for transmitting the high-resolution image between the sender and the receiver is further reduced.

In a possible implementation, the encoding the image residual may include: encoding the image residual by using a lossless encoding scheme. This manner can avoid the transmission loss of the image residual, ensure quality of the image residual, and further ensure quality of an image restored by using the image residual.

According to a second aspect, an embodiment of this application provides an image transmission method. The method may be applied to a sender in a transmission system, or may be applied to a chip in the sender. The method in this embodiment of this application is used to resolve a problem that an existing manner of transmitting a high-resolution video causes a large transmission loss of the high-resolution video. Specifically, a first high-resolution image is converted into a first low-resolution image. First resolution of the first high-resolution image is higher than second resolution of the first low-resolution image. The first low-resolution image is encoded. For example, the first low-resolution image is encoded by using a lossy encoding scheme to obtain a first bitstream. The first bitstream is decoded to obtain a second low-resolution image. A second high-resolution image is reconstructed by using the second low-resolution image. Third resolution of the second high-resolution image is higher than the second resolution. An image residual between the first high-resolution image and the second high-resolution image is obtained. The image residual is encoded to obtain a second bitstream. The first bitstream and the second bitstream are sent.

Optionally, the method may be applied to video transmission, and the first high-resolution image is a frame of image in a video.

According to the image transmission method provided in this embodiment, in a manner in which the sender obtains the second high-resolution image by using the decoded second low-resolution image, the second high-resolution image obtained by the sender covers encoding and decoding losses of the first low-resolution image in a transmission process. The image residual obtained by the sender based on the second high-resolution image and the first high-resolution image also covers the encoding and decoding losses of the first low-resolution image in the transmission process. In this way, after obtaining the second high-resolution image based on the second low-resolution image, a receiver may eliminate the loss of the first low-resolution image in the transmission process when combining the second high-resolution image and the image residual obtained through decoding. This reduces a loss of a third high-resolution image restored by the receiver and improves image quality. When the method is used to transmit the high-resolution video, image quality of the high-resolution video can be improved, and user experience is improved.

In a possible implementation, the reconstructing a second high-resolution image by using the second low-resolution image may include: reconstructing the second high-resolution image by using the second low-resolution image and a neural network.

In a possible implementation, the first resolution and the third resolution are the same, and the obtaining an image residual between the first high-resolution image and the second high-resolution image may include: subtracting a pixel value of a first pixel in the first high-resolution image from a pixel value of a second pixel in the second high-resolution image corresponding to the first pixel, to obtain a first pixel residual in the image residual. Alternatively, the first resolution is higher than the third resolution, and the obtaining an image residual between the first high-resolution image and the second high-resolution image may include: converting the second high-resolution image into a fourth high-resolution image, where the fourth high-resolution image has the first resolution; and subtracting a pixel value of a first pixel in the first high-resolution image from a pixel value of a third pixel in the fourth high-resolution image corresponding to the first pixel, to obtain a second pixel residual in the image residual. In this manner, the image residual may be obtained in a plurality of manners. This expands an application scenario of the solution.

In a possible implementation, the encoding the image residual may include: encoding the image residual by using the lossy encoding scheme. In this manner, a transmission bit rate of the image residual can be reduced, and a transmission bit rate for transmitting the high-resolution image between the sender and the receiver is further reduced.

In a possible implementation, the encoding the image residual may include: encoding the image residual by using a lossless encoding scheme. This manner can avoid a transmission loss of the image residual, further reduce a loss of the third high-resolution image restored by the receiver, and improve image quality.

Optionally, the method may be applied to video transmission, and the first high-resolution image is a frame of image in a video.

According to a third aspect, an embodiment of this application provides an image transmission method. The method may be applied to a receiver in a transmission system, or may be applied to a chip in the receiver. Specifically, a first bitstream and a second bitstream are received. The first bitstream is decoded to obtain a second low-resolution image. A second high-resolution image is reconstructed by using the second low-resolution image. First resolution of the second high-resolution image is higher than second resolution of the second low-resolution image, and the second high-resolution image includes high-frequency information of a first high-resolution image and excludes low-frequency information of the first high-resolution image. The second bitstream is decoded to obtain an image residual between the first high-resolution image and the second high-resolution image. The image residual is used to reflect the low-frequency information. The second high-resolution image and the image residual are combined to obtain a third high-resolution image.

It should be understood that the high-frequency information is image detail information and the low-frequency information is image outline information. In the first high-resolution image, the image detail information changes more rapidly than the image outline information.

Optionally, the method may be applied to video transmission, and the first high-resolution image is a frame of image in a video.

In a possible implementation, the reconstructing a second high-resolution image by using the second low-resolution image may include: reconstructing the second high-resolution image by using the second low-resolution image and a neural network.

In a possible implementation, the combining the second high-resolution image and the image residual to obtain a third high-resolution image may include: adding a pixel value of a second pixel in the second high-resolution image to a pixel residual in the image residual corresponding to the second pixel, to obtain a third pixel in the third high-resolution image corresponding to the second pixel.

For beneficial effects of the image transmission method provided in the third aspect and the possible implementations of the third aspect, refer to beneficial effects brought by the first aspect and the possible implementations of the first aspect. Details are not described herein again.

According to a fourth aspect, an embodiment of this application provides a transmission apparatus. The transmission apparatus may include a first processing module, a first encoding module, a second processing module, a third processing module, a second encoding module, and a sending module. Optionally, in some embodiments, the transmission apparatus may further include a decoding module.

The first processing module is configured to convert a first high-resolution image into a first low-resolution image. First resolution of the first high-resolution image is higher than second resolution of the first low-resolution image. The first encoding module is configured to encode the first low-resolution image to obtain a first bitstream. The second processing module is configured to obtain a second high-resolution image. Third resolution of the second high-resolution image is higher than the second resolution, and the second high-resolution image includes high-frequency information of the first high-resolution image and excludes low-frequency information of the first high-resolution image. The third processing module is configured to obtain an image residual between the first high-resolution image and the second high-resolution image. The image residual is used to reflect the low-frequency information. The second encoding module is configured to encode the image residual to obtain a second bitstream. The sending module is configured to send the first bitstream and the second bitstream.

It should be understood that the high-frequency information is image detail information and the low-frequency information is image outline information. In the first high-resolution image, the image detail information changes more rapidly than the image outline information.

In a possible implementation, the decoding module is configured to decode the first bitstream to obtain a second low-resolution image. The second processing module is specifically configured to reconstruct the second high-resolution image by using the second low-resolution image. For example, the second processing module is specifically configured to reconstruct the second high-resolution image by using the second low-resolution image and a neural network.

In a possible implementation, the first resolution and the third resolution are the same, and the third processing module is specifically configured to subtract a pixel value of a first pixel in the first high-resolution image from a pixel value of a second pixel in the second high-resolution image corresponding to the first pixel, to obtain a first pixel residual in the image residual. Alternatively, the first resolution is higher than the third resolution, and the third processing module is specifically configured to: convert the second high-resolution image into a fourth high-resolution image, and subtract a pixel value of a first pixel in the first high-resolution image from a pixel value of a third pixel in the fourth high-resolution image corresponding to the first pixel, to obtain a second pixel residual in the image residual. The fourth high-resolution image has the first resolution.

In a possible implementation, the first encoding module is specifically configured to encode the first low-resolution image by using a lossy encoding scheme.

In a possible implementation, the second encoding module is specifically configured to encode the image residual by using the lossy encoding scheme.

In a possible implementation, the second encoding module is specifically configured to encode the image residual by using a lossless encoding scheme.

In a possible implementation, the apparatus is applied to video transmission, and the first high-resolution image is a frame of image in a video.

For beneficial effects of the transmission apparatus provided in the fourth aspect and the possible implementations of the fourth aspect, refer to beneficial effects brought by the first aspect and the possible implementations of the first aspect. Details are not described herein again.

According to a fifth aspect, an embodiment of this application provides a transmission apparatus. The transmission apparatus may include a first processing module, a first encoding module, a decoding module, a second processing module, a third processing module, a second encoding module, and a sending module.

The first processing module is configured to convert a first high-resolution image into a first low-resolution image. First resolution of the first high-resolution image is higher than second resolution of the first low-resolution image. The first encoding module is configured to encode the first low-resolution image (for example, encode the first low-resolution image by using a lossy encoding scheme) to obtain a first bitstream. The decoding module is configured to decode the first bitstream to obtain a second low-resolution image. The second processing module is configured to reconstruct a second high-resolution image by using the second low-resolution image. Third resolution of the second high-resolution image is higher than the second resolution. The third processing module is configured to obtain an image residual between the first high-resolution image and the second high-resolution image. The second encoding module is configured to encode the image residual to obtain a second bitstream. The sending module is configured to send the first bitstream and the second bitstream.

In a possible implementation, the second processing module is specifically configured to reconstruct the second high-resolution image by using the second low-resolution image and a neural network.

In a possible implementation, the first resolution and the third resolution are the same, and the third processing module is specifically configured to subtract a pixel value of a first pixel in the first high-resolution image from a pixel value of a second pixel in the second high-resolution image corresponding to the first pixel, to obtain a first pixel residual in the image residual. Alternatively, the first resolution is higher than the third resolution, and the third processing module is specifically configured to: convert the second high-resolution image into a fourth high-resolution image, and subtract a pixel value of a first pixel in the first high-resolution image from a pixel value of a third pixel in the fourth high-resolution image corresponding to the first pixel, to obtain a second pixel residual in the image residual. The fourth high-resolution image has the first resolution.

In a possible implementation, the second encoding module is specifically configured to encode the image residual by using the lossy encoding scheme.

In a possible implementation, the second encoding module is specifically configured to encode the image residual by using a lossless encoding scheme.

In a possible implementation, the apparatus is applied to video transmission, and the first high-resolution image is a frame of image in a video.

For beneficial effects of the transmission apparatus provided in the fifth aspect and the possible implementations of the fifth aspect, refer to beneficial effects brought by the second aspect and the possible implementations of the second aspect. Details are not described herein again.

According to a sixth aspect, an embodiment of this application provides a transmission apparatus. The transmission apparatus may include a receiving module, a first decoding module, a first processing module, a second decoding module, and a second processing module.

The receiving module is configured to receive a first bitstream and a second bitstream. The first decoding module is configured to decode the first bitstream to obtain a second low-resolution image. The first processing module is configured to reconstruct a second high-resolution image by using the second low-resolution image. First resolution of the second high-resolution image is higher than second resolution of the second low-resolution image, and the second high-resolution image includes high-frequency information of a first high-resolution image and excludes low-frequency information of the first high-resolution image. The second decoding module is configured to decode the second bitstream to obtain an image residual between the first high-resolution image and the second high-resolution image. The image residual is used to reflect the low-frequency information. The second processing module is configured to combine the second high-resolution image and the image residual to obtain a third high-resolution image.

It should be understood that the high-frequency information is image detail information and the low-frequency information is image outline information. In the first high-resolution image, the image detail information changes more rapidly than the image outline information.

In a possible implementation, the first processing module is specifically configured to reconstruct the second high-resolution image by using the second low-resolution image and a neural network.

In a possible implementation, the second processing module is specifically configured to add a pixel value of a second pixel in the second high-resolution image to a pixel residual in the image residual corresponding to the second pixel, to obtain a third pixel in the third high-resolution image corresponding to the second pixel.

In a possible implementation, the apparatus is applied to video transmission, and the first high-resolution image is a frame of image in a video.

For beneficial effects of the transmission apparatus provided in the sixth aspect and the possible implementations of the sixth aspect, refer to beneficial effects brought by the first aspect and the possible implementations of the first aspect. Details are not described herein again.

According to a seventh aspect, an embodiment of this application provides a transmission device. The transmission device includes a processor system and a memory. The memory is configured to store computer executable program code, and the program code includes instructions. When the processor system executes the instructions, the instructions enable the transmission device to perform the method described in any one of the first aspect to the third aspect.

According to an eighth aspect, an embodiment of this application provides a transmission system. The transmission system may include the sender described in the first aspect and the receiver described in the third aspect; the sender described in the second aspect; the transmission apparatus described in the fourth aspect and the transmission apparatus described in the sixth aspect; the transmission apparatus described in the fifth aspect; or the transmission device described in the seventh aspect.

According to a ninth aspect, an embodiment of this application provides a chip. The chip stores a computer program, and when the computer program is executed by the chip, the method described in any one of the first aspect to the third aspect is implemented.

According to a tenth aspect, an embodiment of this application provides a transmission apparatus, including a unit, a module, or a circuit configured to perform the method provided in the first aspect or the possible implementations of the first aspect, or the method provided in the second aspect or the possible implementations of the second aspect. The transmission apparatus may be a sender, or may be a module applied to a sender, for example, may be a chip applied to the sender.

According to an eleventh aspect, an embodiment of this application provides a transmission apparatus, including a unit, a module, or a circuit configured to perform the method provided in the third aspect or the possible implementations of the third aspect. The transmission apparatus may be a receiver, or may be a module applied to a receiver, for example, may be a chip applied to the receiver.

According to a twelfth aspect, an embodiment of this application provides a computer-readable storage medium, configured to store a computer program or instructions. When the computer program or instructions is/are run on a computer, the computer is enabled to perform the method described in any one of the first aspect to the third aspect.

According to a thirteenth aspect, an embodiment of this application provides a computer program product. When the computer program product runs on a computer, the computer is enabled to perform the method described in any one of the first aspect to the third aspect.

According to a fourteenth aspect, an embodiment of this application provides a computer program product including instructions. When the computer program product runs on a computer, the computer is enabled to perform the method described in any one of the first aspect to the third aspect.

DESCRIPTION OF EMBODIMENTS

Figure 1:
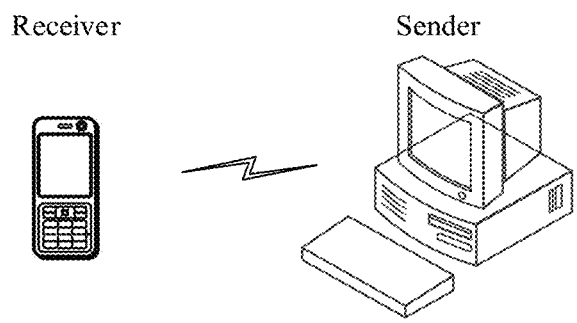
FIG. 1 is a schematic diagram of an architecture of a transmission system to which an embodiment of this application is applied.

FIG. 1 is a schematic diagram of an architecture of a transmission system to which an embodiment of this application is applied. As shown in FIG. 1, the transmission system may include a sender and a receiver. The sender is connected to the receiver in a wireless or wired manner. FIG. 1 is merely a schematic diagram. Another network device may be further included between the sender and the receiver in the transmission system, for example, a relay device and a backhaul device may be further included, which are not shown in FIG. 1. A quantity of senders and a quantity of receivers included in the transmission system are not limited in this embodiment of this application. For ease of description, the sender and the receiver are collectively referred to as transmission devices in the following application document.

The transmission device may be located at a fixed location, or may be mobile. For example, the transmission device may be deployed on land, including indoor or outdoor and handheld or vehicle-mounted devices, may be deployed on a water surface, or may be deployed on an airplane, a balloon, and an artificial satellite in the air.

The transmission device in this embodiment of this application may be a server, a terminal device, or the like. The terminal device may also be referred to as a terminal, user equipment (UE), a mobile station (MS), a mobile terminal (MT), or the like. The terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

An application scenario of the transmission system is not limited in this embodiment of this application. For example, the transmission system may be applied to a video transmission scenario and/or another static image transmission scenario. Although video transmission and video processing are mainly used as an example in the following description, a related technical solution may also be used for transmission and processing of a static image. This is not limited in this embodiment.

To facilitate understanding of a video transmission procedure of the transmission system, the following first explains and describes some concepts.

A pixel is a unit in an image. A frame of image includes a plurality of pixels. Each pixel has a specific location and an allocated color value in the image. Locations and color values of all pixels determine how the image is presented. In some embodiments, a pixel may also be referred to as a sample. They are not distinguished in this embodiment of this application.

Data of each pixel (namely, data used to reflect a color value) is related to a format of an image. Currently, common image formats include an RBG format and a YUV format. When the format of the image is the RBG format, each pixel includes data of 3 channels, which are respectively data representing red sensitivity of the image, data representing blue sensitivity of the image, and data representing green sensitivity of the image. When the format of the image is the YUV format, each pixel includes data of 1.5 channels, which are respectively data representing image luminance and data representing image color. It should be understood that a specific format of the image is related to how an image signal processor (ISP) of the sender processes the image. For details, refer to the conventional technology. Details are not described herein.

A quantity of pixels included in a frame of image is related to resolution of the image. For example, the resolution of the image is 3840×2160, and the resolution represents that each row of the image has 3840 pixels horizontally, and each column of the image has 2160 pixels vertically. It should be understood that, when a size of the image is fixed, higher resolution of the image indicates more pixels included in the image, and the image is clearer (or image quality is higher). Correspondingly, the image includes more data.

A video includes a plurality of consecutive static image frames, and a frame is a frame of image (which may also be referred to as one image). In other words, the video is a continuous image sequence. Therefore, the resolution of the image may also be understood as resolution of the video, and the format of the image may also be understood as a format of the video. In other words, the video includes consecutive static images with same resolution and a same format. Higher resolution of the video indicates higher definition of the video and a larger data amount of the video. For ease of understanding, the following Table 1 provides examples of some common resolution of the video. It should be understood that Table 1 is merely an example, and does not limit the resolution of the video.

TABLE 1

| Resolution code | Standard | Resolution |
| --- | --- | --- |
| Common video standard format (common intermediate format, CIF) | Standard image format | 352 × 288 |
| 480p | Digital television system standard | 720 × 480 |
| 720p | High definition television standard | 1280 × 720 |

TABLE 1-continued

| Resolution code | Standard | Resolution |
|---|---|---|
| 1080p | High definition television standard | 1920 × 1080 |
| 2K | Digital cinema system standard | 2048 × 1080 |
| 4K | Digital cinema system standard | 4096 × 2160, 3840 × 2160, and 4608 × 2592 |
| 8K | Digital cinema system standard | 7680 × 4320 |

Usually, the high or low value of the resolution of the video is a relative concept. For example, a 2K video is used as an example. Compared with a 1080p video, the 2K video is a high-resolution video. Compared with a 4K video, the 2K video is a low-resolution video. In this embodiment of this application, for ease of description, a video with high resolution and a large data amount is referred to as a high-resolution video such as a 4K video and an 8K video. Therefore, resolution of a high-resolution video involved in subsequent embodiments is higher than resolution of a low-resolution video. For a specific value, refer to the foregoing example, but the specific value is not limited.

Figure 2:
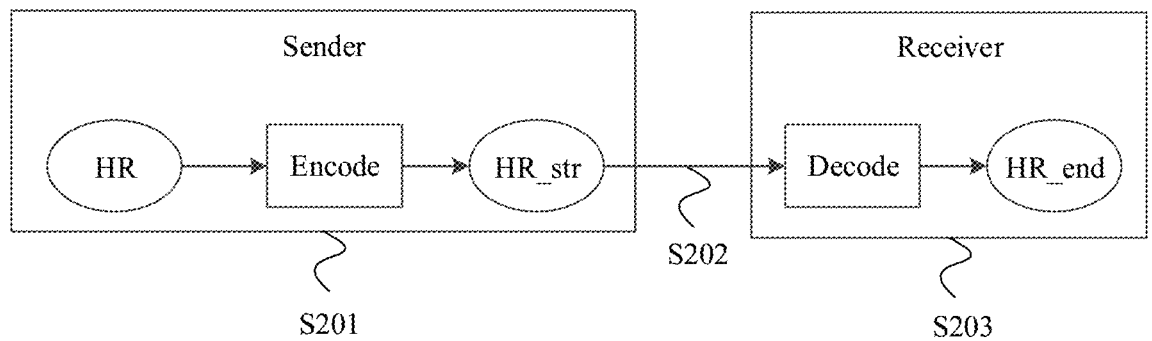
FIG. 2 is a schematic diagram of video transmission.

FIG. 2 is a schematic diagram of video transmission. As shown in FIG. 2, currently a sender and a receiver usually transmit a high-resolution video in the following manner.

S201: The sender encodes the to-be-transmitted high-resolution video HR to obtain a bitstream HR_str of the high-resolution video HR. An encoding scheme used by the sender to encode the high-resolution video HR may be a general encoding scheme, for example, an encoding scheme using the H.264 protocol, an encoding scheme using the H.265 protocol, or the like.

S202: The sender sends the bitstream HR_str to the receiver. Correspondingly, the receiver receives the bitstream HR_str.

S203: The receiver decodes the bitstream HR_str to obtain a decoded high-resolution video HR_end. In other words, HR_end is a high-resolution video obtained by the receiver. A decoding scheme used when the receiver decodes the bitstream HR_str is related to the encoding scheme used by the sender. For example, the sender uses the encoding scheme of the H.264 protocol, and correspondingly the receiver may use a decoding scheme of the H.264 protocol. The sender uses the encoding scheme of the H.265 protocol, and correspondingly the receiver may use a decoding scheme of the H.265 protocol.

A transmission bit rate of the video may be shown in the following formula (1):

Transmission bit rate=Size of each frame×Quantity of frames/Compression ratio   (1).

The transmission bit rate is a quantity of bits, of the video, transmitted per second, and the transmission bit rate is a bit rate required for sending the video by the sender and a bit rate required for receiving the video by the receiver. A quantity of frames is a quantity of frames, of the video, transmitted per second. The compression ratio is related to the encoding scheme and the resolution of the video. A size of each frame of image may be shown in the following formula (2):

Image size=Resolution×Quantity of channels×Data bit width   (2).

The quantity of channels may be determined based on a format of the video. For example, if the format of the video is an RBG format, the quantity of channels is 3. If the format of the video is a YUV format, the quantity of channels is 1.5. The data bit width is a quantity of bits occupied by each piece of data of one pixel, and is usually 8 bits.

For example, a 4K video is transmitted in a transmission mode shown in FIG. 2. It is assumed that 30 frames of images in the 4K video may be transmitted per second. Resolution of the 4K video is 3840×2160, a format of the 4K video is the YUV format, and each piece of data of one pixel uses an 8-bit width. The sender encodes the 4K video by using the encoding scheme of the H.265 protocol. Usually, a compression ratio of the 4K video encoded by using the encoding scheme of the H.265 protocol can reach 100 times.

In this example, it can be learned from a calculation method of the formula (1) that the following transmission bit rate required for transmitting the 4K video is:

(3840×2160×1.5×8)×30/100=29859840.

To be specific, when the sender sends the 4K video, the transmission bit rate needs to reach 29859840 bits per second (bps), about 28.5 megabits per second (Mbps). Correspondingly, when receiving the 4K video, the receiver also needs to use the transmission bit rate of 28.5 Mbps.

It can be learned from this example that, because a data amount of the high-resolution video is large, a transmission device needs to use a high transmission bit rate (for example, a transmission bit rate greater than 30 Mbps) to transmit the high-resolution video. In other words, an amount of transmitted data is large. However, limited by bandwidth, power consumption, and the like of the transmission device, a transmission bit rate supported by a conventional transmission device ranges from 1 Mbps to 20 Mbps. Consequently, problems such as a long transmission delay, low transmission efficiency, poor image quality, and video freezing that are of a high-resolution video are caused, and an application scenario of transmitting the high-resolution video in real time cannot be met. The application scenario of transmitting the high-resolution video in real time herein may be, for example, network live broadcast, online watching of high-definition videos, and high-definition video conferences.

In addition, when transmitting the high-resolution video in the manner shown in FIG. 2, the transmission device uses a general encoding and decoding protocol. An encoding scheme in the general encoding and decoding protocol is to obtain a high compression ratio by compromising image quality to some extent. Therefore, a loss of the high-resolution video restored by the receiver through decoding is large, degrading user experience of the receiver. Therefore, how to transmit the high-resolution video is an urgent problem to be resolved.

Figure 2A:
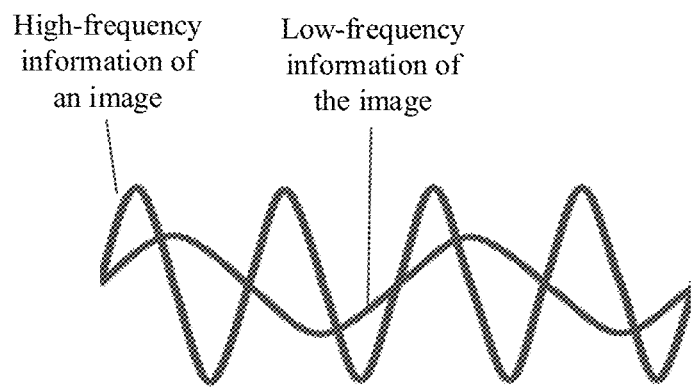
FIG. 2A is a schematic diagram of frequency domain of an image.

FIG. 2A is a schematic diagram of frequency domain of an image. As shown in FIG. 2A, it is found through image research that a frame of image includes high-frequency information (usually image detail information) and low-frequency information (usually image outline information). After frequency domain conversion is performed on an image, it can be learned that a frequency of the image detail information changes faster, and is higher than a frequency of the image outline information. To be specific, the image detail information changes more rapidly in the image compared with the image outline information. For details, refer to comparison description in FIG. 6 and FIG. 7. For details, refer to the following description. In other words, image information with a higher frequency changes faster. Image information with a lower frequency changes slower. A data amount reflecting the image detail information (namely, the high-frequency information) is usually greater than a data amount reflecting the image outline information (namely, the low-frequency information). In some embodiments, the low-frequency information may also be referred to as a low-frequency component, and the high-frequency information may also be referred to as a high-frequency component. It should be noted that a high frequency and a low frequency herein are not fixed frequency bands, but two relative frequencies in a frame of image. In other words, in a frame of image, the higher frequency is referred to as a high frequency, and the lower frequency is referred to as a low frequency. Different images may have different high frequency and low frequency ranges, provided that a frequency of low-frequency information is lower than a frequency of high-frequency information in frequency domain.

In view of this feature, an embodiment of this application provides an image transmission method. A high-resolution image is decomposed, for transmission, into a low-resolution image and an image residual used to reflect low-frequency information of the high-resolution image. Because the low-resolution image and the image residual carry a small amount of data, a transmission bit rate for transmitting a high-definition image can be greatly reduced, that is, an amount of transmitted data is reduced. When the method is used to transmit the high-resolution video, the transmission bit rate of the high-resolution video can also be greatly reduced. This can satisfy an application scenario of transmitting the high-resolution video in real time. It should be understood that the image transmission method provided in this embodiment of this application includes but is not limited to the foregoing application scenario of transmitting the high-definition image and/or the high-resolution video, and may also be applicable to any other scenario in which an image and/or a video need/needs to be transmitted. Details are not described herein again.

Figure 3:
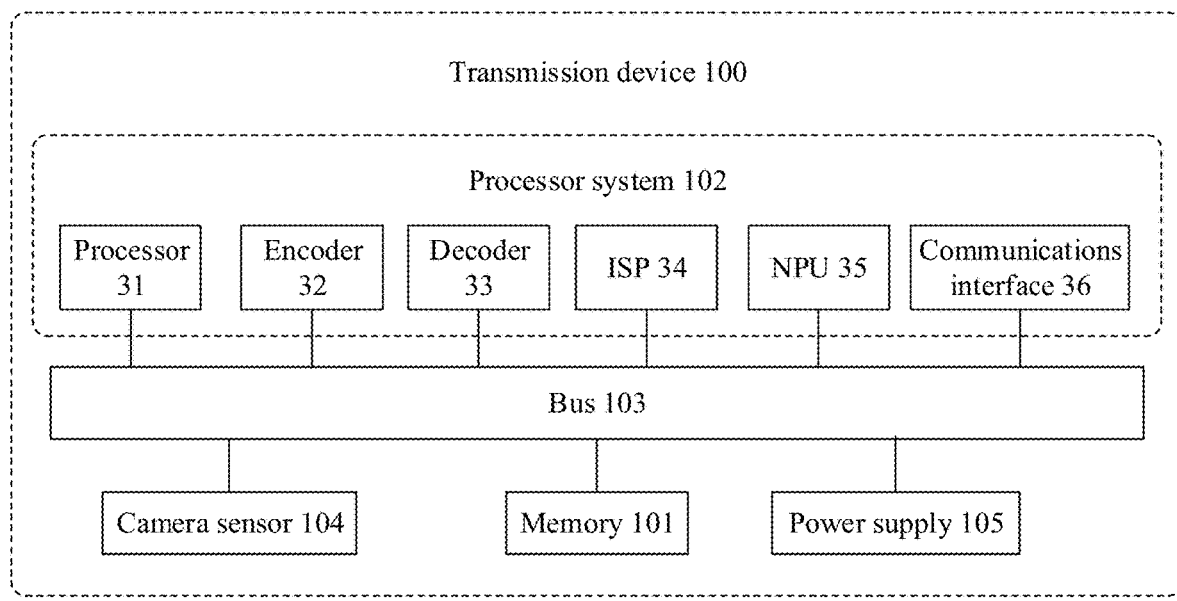
FIG. 3 is a schematic diagram of a structure of a transmission device according to an embodiment of this application.

To facilitate understanding of embodiments of this application, the following first describes a transmission device 100 in embodiments of this application by using an example. FIG. 3 is a schematic diagram of a structure of a transmission device 100 according to an embodiment of this application. As shown in FIG. 3, the transmission device 100 includes a memory 101 and a processor system 102. The memory 101 and the processor system 102 are communicatively connected to each other. For example, a network connection mode may be used between the memory 101 and the processor system 102 to implement a communications connection. Alternatively, the transmission device 100 may further include a bus 103. The memory 101 and the processor system 102 implement mutual communications connections by using the bus 103. FIG. 3 shows the transmission device 100 in which the memory 101 and the processor system 102 implement the mutual communications connections by using the bus 103. It should be understood that, when the transmission device 100 includes the bus 103, the bus 103 may include a path for transmitting information between components (for example, the memory 101 and the processor system 102) of the transmission device 100.

The memory 101 may include a read-only memory (ROM), a static storage device, a dynamic storage device, or a random access memory (RAM). The memory 101 may store a program. When the program stored in the memory 101 is executed by the processor system 102, the processor system 102 and a communications interface 36 are configured to perform an action of a sender or an action of a receiver in the image transmission method provided in embodiments of this application.

The processor system 102 may include various processors for performing the image transmission method provided in embodiments of this application, for example, at least one of the following: a processor 31, an encoder 32, a decoder 33, an image processor (ISP) 34, an embedded neural network processing unit (NPU) 35, and the communications interface 36.

The processor 31 may be, for example, configured to perform operations such as image resolution conversion and obtaining of an image residual. The encoder 32 may be, for example, configured to perform encoding processing on an image. The decoder 33 may be, for example, configured to perform decoding processing on an image. The ISP 34 may be, for example, configured to process image data to obtain one or more frames of images. For example, the NPU may be configured to implement a function of a neural network, and the communications interface 36 may be configured to implement communication between the transmission device 100 and another device or a communications network. Optionally, in some embodiments, a graphics processing unit (GPU) may be used to replace the NPU to implement the function of the neural network, or a CPU is used to replace the NPU to implement the function of the neural network, or the like.

The processor 31 may include a general-purpose central processing unit (CPU), a microprocessor, or a microcontroller, and further includes an application specific integrated circuit (ASIC), a graphics processing unit (GPU), or one or more integrated circuits.

Alternatively, the processor 31 may be an integrated circuit chip and has a signal processing capability. In an implementation process, a function of the transmission device 100 in this application may be implemented by using an integrated logic circuit of hardware in the processor 31 or instructions in a form of software. The processor 31 may further include a general-purpose processor, a digital signal processor (DSP), an application-specific integrated circuit (ASIC), a field programmable gate array (FPGA), or another programmable logic device, a discrete gate or transistor logic device, or a discrete hardware component, and may implement or perform the methods, the steps, and the logical block diagrams that are disclosed in the following embodiments of this application. The general-purpose processor may be a microprocessor, or the processor may be any conventional processor or the like, for example, the CPU, the microprocessor, or the microcontroller mentioned above. The steps of the method disclosed in the following embodiments of this application may be directly performed by a processor system, or may be performed by using a combination of hardware and software modules in the processor system. The software module may be located in a mature storage medium in the art, for example, a random access memory, a flash memory, a read-only memory, a programmable read-only memory, an electrically erasable programmable memory, a register, or the like. The storage medium is located in the memory 101. The processor 31 reads information in the memory 101, and implements a function of the transmission device 100 in this embodiment of this application in combination with hardware of the processor 31.

The communications interface 36 uses a transceiver module, for example but not for limitation, a transceiver, to implement communication between the transmission device 100 and another device or a communications network. For example, an image may be transmitted through the communications interface 36. Optionally, in some embodiments, the transmission device 100 may further include a camera sensor 104 and a power supply 105. This is not limited in this embodiment.

The following describes in detail the technical solutions in embodiments of this application with reference to specific embodiments by using an example in which the transmission device shown in FIG. 3 is used as a sender and a receiver. To be specific, the device shown in FIG. 3 may be used at both the sender and the receiver. Certainly, the two devices do not need to be completely the same, and a partial design may be slightly changed, which does not affect a technical implementation. The following several specific embodiments may be combined with each other, and same or similar concepts or processes may not be described in detail in some embodiments.

Figure 4:
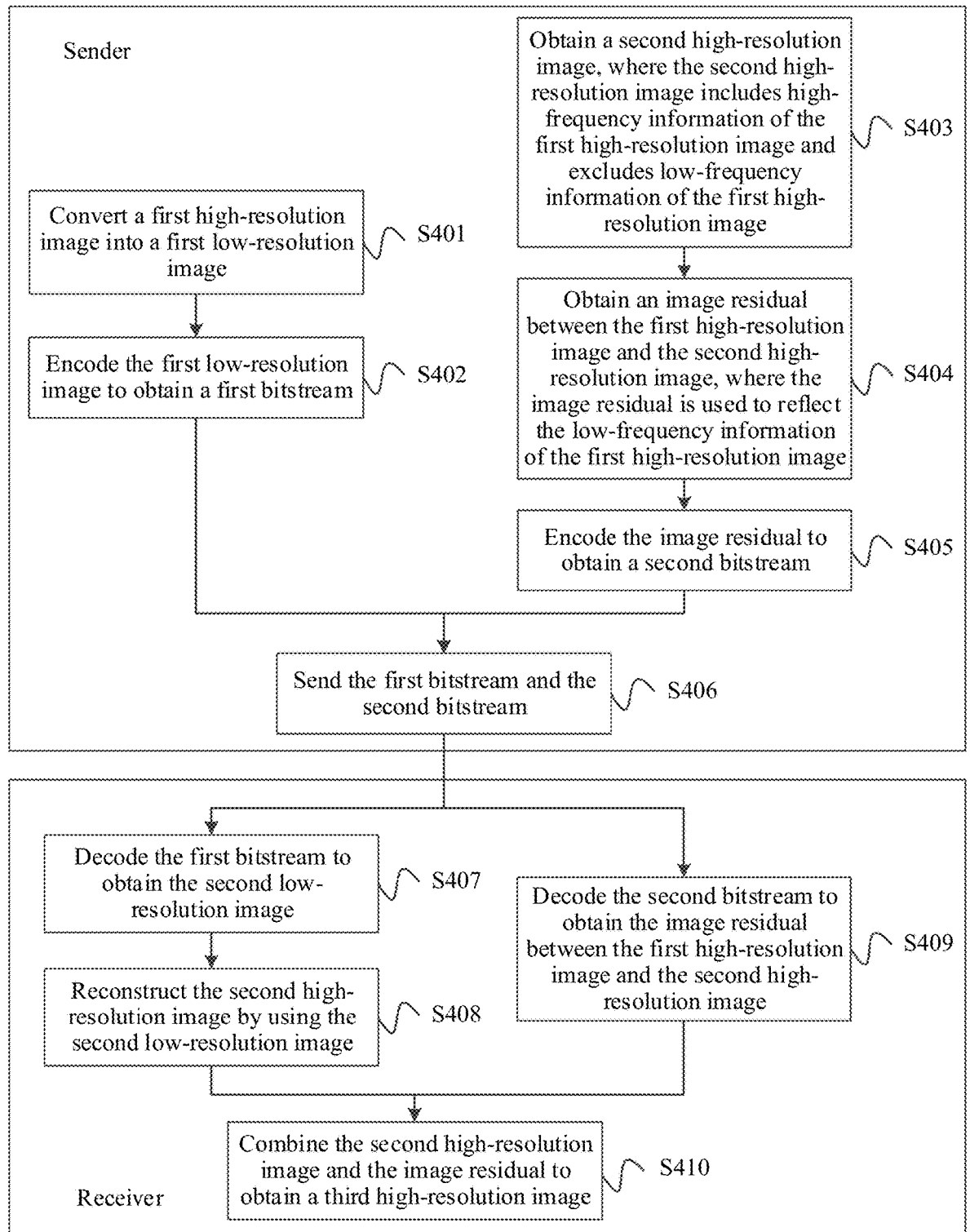
FIG. 4 is a schematic flowchart of an image transmission method according to an embodiment of this application.

FIG. 4 is a schematic flowchart of an image transmission method according to an embodiment of this application. This embodiment relates to a process of decomposing, for transmission, a to-be-transmitted original high-resolution image into a low-resolution image and an image residual used to reflect low-frequency information of the high-resolution image. As shown in FIG. 4, the method may include the following steps. S401: A sender converts a first high-resolution image into a first low-resolution image. The first high-resolution image is the to-be-transmitted original high-resolution image, and first resolution of the first high-resolution image may be, for example, 4K, 8K, or the like. Optionally, when the method is applied to video transmission, and the first high-resolution image may be a frame of image in a video. In this case, the first resolution of the first high-resolution image may also be referred to as resolution of the video.

In this embodiment, the sender converts the resolution of the first high-resolution image to obtain the first low-resolution image. In other words, the first resolution of the first high-resolution image is higher than second resolution of the first low-resolution image. For example, the second resolution of the first low-resolution image may be, for example, '720p, 480p, CIF, or the like. For example, the sender may convert the resolution of the first high-resolution image by using a CPU 31 of the sender to obtain the first low-resolution image.

An implementation of converting the first high-resolution image into the first low-resolution image by the sender is not limited in this embodiment. The following uses an example in which the first high-resolution image with resolution of 3840×2160 is converted into the first low-resolution image with resolution of 1280×720. The sender may, for example, convert the first high-resolution image into the first low-resolution image in a manner shown in the following Table 2.

TABLE 2

| Conversion method | Implementation |
|---|---|
| Maximum sampling | For every 3 × 3 pixels in the first high-resolution image, only a value of a pixel whose value is the largest is retained, to obtain the first low-resolution image |
| Average value sampling | For every 3 × 3 pixels in the first high-resolution image, an average value of the nine pixels is retained, to obtain the first low-resolution image |
| Fixed location sampling | For every 3 × 3 pixels in the first high-resolution image, a value of a pixel at a fixed location is retained, to obtain the first low-resolution image |
| Random location sampling | For every 3 × 3 pixels in the first high-resolution image, a value of a pixel at a location is randomly retained, to obtain the first low-resolution image |

TABLE 2-continued

| Conversion method | Implementation |
|---|---|
| Convolutional conversion | Convolution operation with a convolution stride equal to 3 is performed on a pixel in the first high-resolution image by using a 3 × 3 convolution kernel, to obtain the first low-resolution image |

It should be understood that Table 2 is merely an example. In a specific implementation, the sender may further convert the first high-resolution image into the first low-resolution image in any other manner that can implement resolution conversion. For example, a distribution-based sampling method, a Markkov chain Monte Carlo sampling method, or a Gibbs sampling method. Details are not described herein again.

Figure 5:
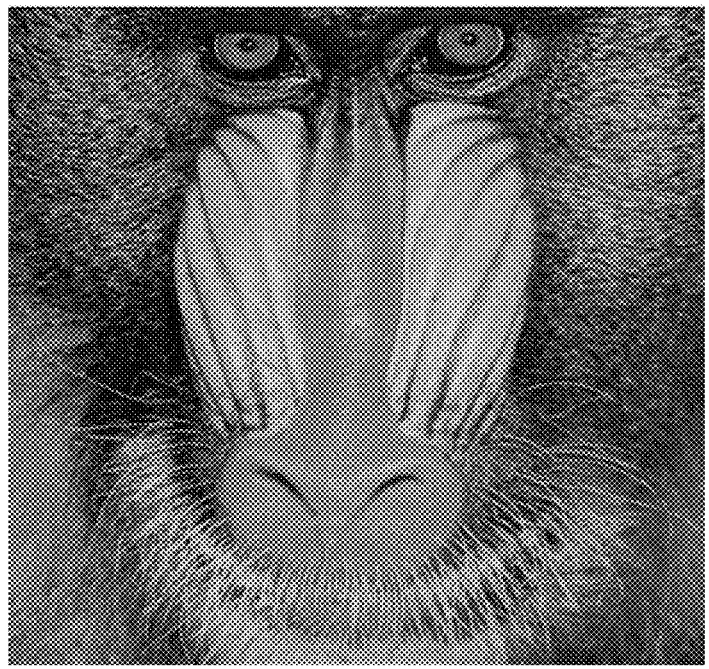
FIG. 5 is a schematic diagram of an image according to an embodiment of this application.

The first high-resolution image includes high-frequency information (usually image detail information) and low-frequency information (usually image outline information). The image detail information changes more rapidly than the image outline information. The following uses an example to describe the first high-resolution image. FIG. 5 is a schematic diagram of an image according to an embodiment of this application. An image shown in FIG. 5 is the first high-resolution image (namely, an original high-resolution image), and the first high-resolution image may clearly reflect detail information of an animal and outline information of the animal.

S402: The sender encodes the first low-resolution image to obtain a first bitstream. For example, the sender may encode the first low-resolution image by using an encoding scheme in a general encoding and decoding protocol to obtain the first bitstream. The encoding scheme in the general encoding and decoding protocol may be, for example, any one of an encoding scheme using the H.264 protocol, an encoding scheme using the H.265 protocol (which may also be referred to as high efficiency video coding (HEVC)), an encoding scheme using the VP8 protocol, an encoding scheme using the VP9 protocol, or an encoding scheme using the RV40 protocol. It should be understood that the encoding scheme in the general encoding and decoding protocol herein may also be referred to as a lossy encoding scheme, namely, an encoding scheme in which a high compression ratio is obtained by compromising image quality to some extent. For example, the compression ratio of the lossy encoding scheme may be 50, 100, 500, or the like. For example, the sender may encode the first low-resolution image by using the encoder 32 of the sender to obtain the first bitstream.

S403: The sender obtains a second high-resolution image, where the second high-resolution image includes high-frequency information of the first high-resolution image and excludes low-frequency information of the first high-resolution image. Third resolution of the second high-resolution image is higher than the second resolution.

Figure 6:
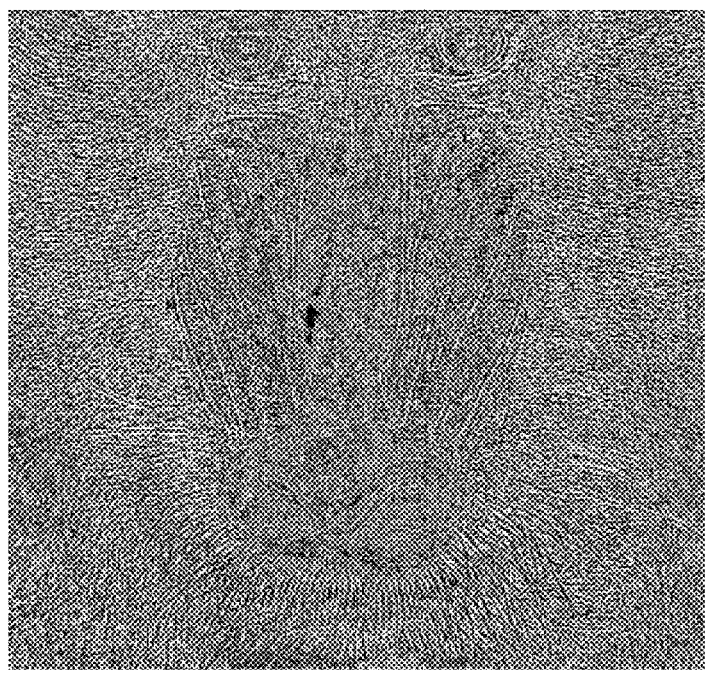
FIG. 6 is a schematic diagram of another image according to an embodiment of this application.

In this embodiment, the second high-resolution image includes the high-frequency information of the first high-resolution image, that is, the rapidly changing detail information of the first high-resolution image, or a high-frequency component of the first high-resolution image. Still refer to the example in FIG. 5. FIG. 6 is a schematic diagram of another image according to an embodiment of this application. The image shown in FIG. 6 is the second high-resolution image corresponding to the first high-resolution image shown in FIG. 5. It can be learned by comparing FIG. 5 and FIG. 6 that the second high-resolution image shown in FIG. 6 mainly includes the detail information of the animal.

Optionally, the sender may obtain the second high-resolution image based on the first low-resolution image. Alternatively, the sender may first encode and further decode the first low-resolution image to obtain a second low-resolution image, and then the sender obtains the second high-resolution image by using the second low-resolution image, or the like. Alternatively, the sender may obtain the second high-resolution image or the like based on the first high-resolution image.

Figure 7:
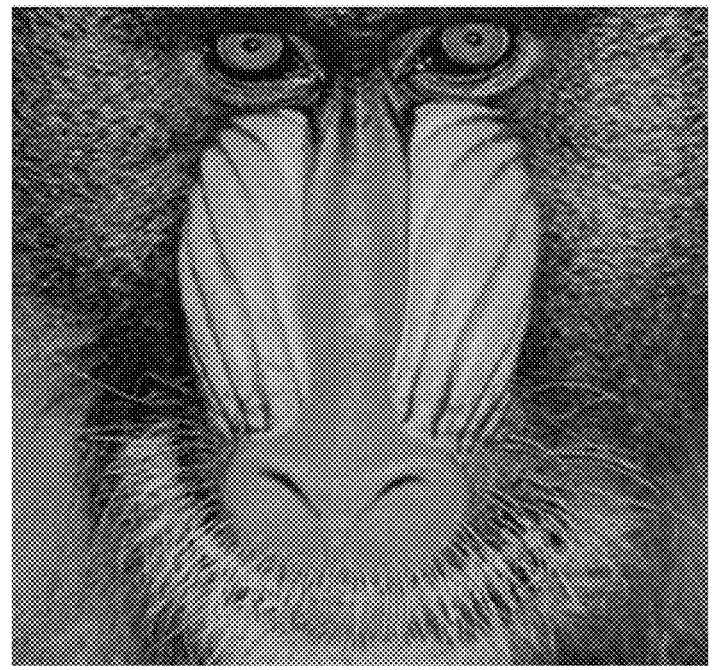
FIG. 7 is a schematic diagram of still another image according to an embodiment of this application.

S404: The sender obtains an image residual between the first high-resolution image and the second high-resolution image, where the image residual is used to reflect the low-frequency information of the first high-resolution image. In other words, the image residual is used to reflect data of the image outline information of the first high-resolution image, that is, a low-frequency component of the first high-resolution image. Still refer to the example in FIG. 5. FIG. 7 is a schematic diagram of still another image according to an embodiment of this application. The image shown in FIG. 7 is the image residual. It can be learned by comparing FIG. 5, FIG. 6, and FIG. 7 that the first high-resolution image includes the detail information of the animal and the outline information of the animal, the second high-resolution image mainly includes the detail information (namely, the high-frequency information) of the animal, and the image residual is used to reflect the outline information (namely, the low-frequency information) of the animal. A texture of the detail information in FIG. 6 changes rapidly in the image. However, a texture of the outline information in FIG. 7 changes slowly.

For example, the first resolution of the first high-resolution image is the same as the third resolution of the second high-resolution image, and the sender may subtract a pixel value of a first pixel in the first high-resolution image from a pixel value of a second pixel in the second high-resolution image corresponding to the first pixel, to obtain a first pixel residual in the image residual. For example, the sender may obtain the image residual between the first high-resolution image and the second high-resolution image by using the processor 31 of the sender.

S405: The sender encodes the image residual to obtain a second bitstream. For example, the sender may encode the image residual by using the encoding scheme in the general encoding and decoding protocol, that is, encode the image residual by using the lossy encoding scheme. The sender may also encode the image residual by using an independent encoding scheme, for example, entropy encoding and an autoencoding network. The independent encoding scheme described herein uses a low compression ratio, and a loss of the image quality may be ignored. For example, the compression ratio of the independent encoding scheme may be between 0.5 and 2. In some embodiments, this encoding scheme may also be referred to as lossless encoding. To be specific, the image residual is encoded by using a lossless encoding scheme. For example, the sender may encode the image residual by using the encoder 32 of the sender to obtain the second bitstream.

S406: The sender sends the first bitstream and the second bitstream. Correspondingly, a receiver receives the first bitstream and the second bitstream. For example, the sender may send the first bitstream and the second bitstream to the communications interface 36 of the receiver through the communications interface 36 of the sender, so that the receiver receives the first bitstream and the second bitstream.

S407: The receiver decodes the first bitstream to obtain the second low-resolution image. A decoding scheme used by the receiver to decode the first bitstream is related to the encoding scheme used by the sender to encode the first low-resolution image. To be specific, when the sender encodes the first low-resolution image by using an encoding scheme of a specific protocol, the receiver needs to correspondingly decode the first bitstream by using a decoding scheme of the protocol. Details are not described herein again. For example, if the sender encodes the first low-resolution image by using the encoding scheme of the VP8 protocol, correspondingly the receiver may decode the first bitstream by using a decoding scheme of the VP8 protocol. In this case, the second low-resolution image obtained by decoding the first bitstream by the receiver has the second resolution. In other words, the resolution of the second low-resolution image is the same as the resolution of the first low-resolution image. For example, the receiver may decode the first bitstream by using the decoder 33 of the receiver to obtain the second low-resolution image.

S408: The receiver reconstructs the second high-resolution image by using the second low-resolution image. A manner in which the second high-resolution image is reconstructed by the receiver by using the second low-resolution image is related to a manner in which the second high-resolution image is obtained by the sender. This part of content is described in detail below.

S409: The receiver decodes the second bitstream to obtain the image residual between the first high-resolution image and the second high-resolution image. A decoding scheme used by the receiver to decode the second bitstream is related to the encoding scheme used by the sender to encode the image residual. To be specific, when the sender encodes the image residual by using an encoding scheme of a specific protocol, the receiver needs to correspondingly decode the second bitstream by using a decoding scheme of the protocol. Details are not described herein again. For example, the receiver may decode the second bitstream by using the decoder 33 of the receiver to obtain the image residual between the first high-resolution image and the second high-resolution image.

S410: The receiver combines the second high-resolution image and the image residual to obtain a third high-resolution image. For example, the receiver adds a pixel value of a second pixel in the second high-resolution image to a pixel residual in the image residual corresponding to the second pixel, to obtain a third pixel in the third high-resolution image corresponding to the second pixel. The third high-resolution image may be obtained by combining third pixels. In this case, the third high-resolution image is a high-resolution image obtained by the receiver.

It should be understood that, the foregoing describes, by using an example in which the first resolution of the first high-resolution image is the same as the third resolution of the second high-resolution image, how the sender obtains the image residual and how the receiver obtains the third high-resolution image by using the image residual.

In some embodiments, if the first resolution of the first high-resolution image is different from the third resolution of the second high-resolution image, for example, the first resolution of the first high-resolution image is higher than the third resolution of the second high-resolution image, or the first resolution of the first high-resolution image is lower than the third resolution of the second high-resolution image, the sender may first convert resolution of the two high-resolution images into a same resolution, and then perform subtraction processing.

For example, the sender may first convert the second high-resolution image into a fourth high-resolution image. The fourth high-resolution image has the first resolution. In other words, the resolution of the first high-resolution image is the same as resolution of the fourth high-resolution image. The sender subtracts the pixel value of the first pixel in the first high-resolution image from a pixel value of a third pixel in the fourth high-resolution image corresponding to the first pixel, to obtain a second pixel residual in the image residual.

For another example, the first high-resolution image is converted into a fifth high-resolution image. The fifth high-resolution image has the third resolution. In other words, resolution of the fifth high-resolution image is the same as the resolution of the second high-resolution image. The sender subtracts a pixel value of a fourth pixel in the fifth high-resolution image from the pixel value of the second pixel in the second high-resolution image corresponding to the fourth pixel, to obtain a second pixel residual in the image residual. Correspondingly, after obtaining the second high-resolution image by decoding the second bitstream, the receiver first combines the second high-resolution image and the image residual to obtain the fifth high-resolution image. Then, the receiver may perform resolution conversion on the fifth high-resolution image to obtain the third high-resolution image. The sender transmits the first high-resolution image to the receiver.

For example, the receiver may combine the second high-resolution image with the image residual by using the processor 31 of the receiver to obtain the third high-resolution image. If an image encoding loss is ignored, the third high-resolution image may be the same as the first high-resolution image at the sender. If encoding causes a loss, the third high-resolution image may be different from the first high-resolution image at the sender, and a slight loss occurs. It may be considered that the restored third high-resolution image is approximately the same as the first high-resolution image.

According to the image transmission method provided in this embodiment, the sender may decompose, for transmission, the to-be-transmitted high-resolution image into the low-resolution image and the image residual used to reflect the low-frequency information of the high-resolution image. In this embodiment, a data amount of the image residual used to reflect the low-frequency information of the high-resolution image is far less than a data amount of an image residual used to reflect the low-frequency information and the high-frequency information of the high-resolution image. Therefore, a transmission bit rate required for transmitting the image residual used to reflect the low-frequency information of the high-resolution image in this embodiment is greatly reduced compared with a transmission bit rate required for transmitting the image residual used to reflect the low-frequency information and the high-frequency information of the high-resolution image. In addition, a transmission bit rate required for transmitting the low-resolution image is also far less than a transmission bit rate required for transmitting the high-resolution image. Therefore, in this embodiment, a low transmission bit rate may be used to transmit the high-resolution image between the sender and the receiver. When the method is used to transmit a high-resolution video, the high-resolution video can be transmitted at a low transmission bit rate, transmission bit rates supported by most transmission devices can be met, and an application scenario of transmitting the high-resolution video in real time can be met.

Figure 8:
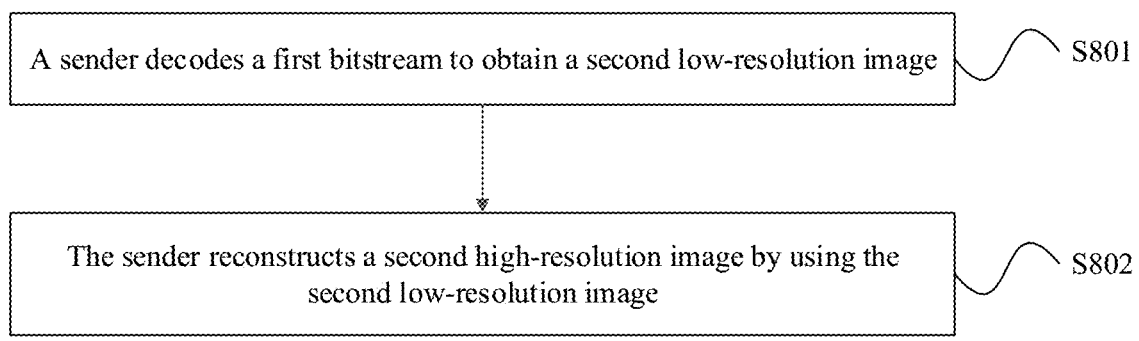
FIG. 8 is a schematic flowchart of obtaining a second high-resolution image according to an embodiment of this application.

The following describes how the sender obtains the second high-resolution image and how the receiver reconstructs the second high-resolution image by using the second low-resolution image. FIG. 8 is a schematic flowchart of obtaining a second high-resolution image according to an embodiment of this application. The sender in this embodiment reconstructs the second high-resolution image by using the second low-resolution image. As shown in FIG. 8, the foregoing step S402 may include S801: The sender decodes the first bitstream to obtain a second low-resolution image. A decoding scheme used by the sender to decode the first bitstream is related to the encoding scheme used by the sender to encode the first low-resolution image. To be specific, when the sender encodes the first low-resolution image by using an encoding scheme of a specific protocol, the first bitstream needs to be correspondingly decoded by using a decoding scheme of the protocol. Details are not described herein again. For example, the first bitstream may be decoded by using the decoder 33 of the sender to obtain the second low-resolution image.

S802: The sender reconstructs the second high-resolution image by using the second low-resolution image. Correspondingly, the receiver may reconstruct the second high-resolution image by using the second low-resolution image in a same manner in S408. In a manner in which the second high-resolution image is obtained by using the decoded second low-resolution image, the second high-resolution image obtained by the sender covers encoding and decoding losses of the first low-resolution image in a transmission process. The image residual obtained by the sender based on the second high-resolution image and the first high-resolution image also covers the encoding and decoding losses of the first low-resolution image in the transmission process. In this way, after obtaining the second high-resolution image based on the second low-resolution image, the receiver may eliminate the loss of the first low-resolution image in the transmission process when combining the second high-resolution image and the image residual obtained through decoding. In this case, only a transmission loss of the image residual exists on a path. This reduces a loss (for example, only the loss of the image residual) of a third high-resolution image restored by the receiver, and there is even no loss (for example, a scenario in which the image residual is encoded by using a lossless encoding scheme). This improves the image quality.

Optionally, the sender may use the following manner to reconstruct the second high-resolution image by using the second low-resolution image.

Manner 1: The sender reconstructs the second high-resolution image by using the second low-resolution image and a neural network. Correspondingly, the receiver may also reconstruct the second high-resolution image by using the neural network. In other words, the same neural network is deployed on the sender and the receiver, to input the second-resolution image into the same neural network to obtain the second high-resolution image output by the neural network.

The neural network includes two parts: a network structure and a convolution kernel parameter. It should be understood that the network structure described herein may include, for example, at least one piece of the following information: a quantity of network layers, a quantity of convolution kernels at each layer, a size of each convolution kernel, a connection relationship between layers, and the like. The convolution kernel parameter is used to restrict an operation performed by a convolution kernel. Therefore, the neural network in this embodiment of this application may be implemented in two steps: a first step is to design the network structure, and a second step is to train the neural network to obtain parameters of convolution kernels.

Figure 9:
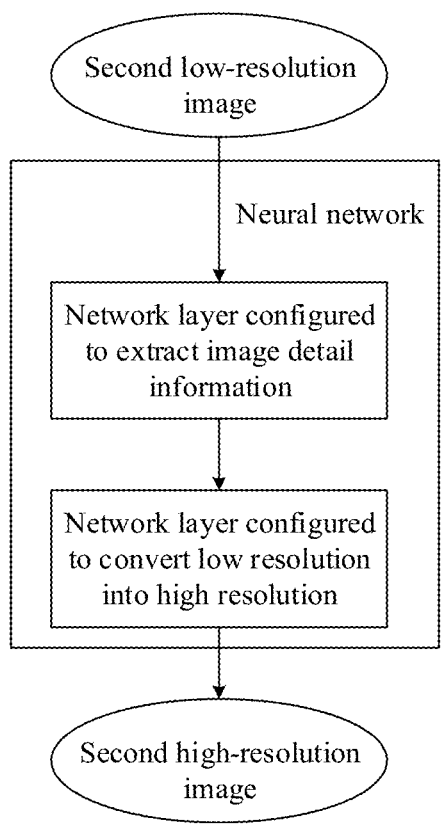
FIG. 9 is a schematic diagram of a neural network model according to an embodiment of this application.

FIG. 9 is a schematic diagram of a neural network model according to an embodiment of this application. As shown in FIG. 9, a network structure may be determined based on a task objective implemented by the neural network. The task objective implemented by the neural network in this embodiment is constructing, by using a low-resolution image, a high-resolution image covering image detail information. In other words, the neural network in this embodiment needs to have two functions: one function is to extract the image detail information, and the other function is to perform resolution conversion. Therefore, a network architecture of the neural network in this embodiment may include two parts: one part is a network layer (extraction layer for short) configured to extract the image detail information, and the other part is a network layer (conversion layer for short) configured to convert low resolution into high resolution. It should be understood that both the extraction layer and the conversion layer described herein may include at least one convolutional layer. The extraction layer may be implemented by using 1 to N convolutional layers, and the conversion layer may be implemented by using 1 to M inverse convolutional layers. Both N and M are integers greater than or equal to 2.

Although FIG. 9 is a schematic diagram of an example in which the extraction layer is located before the conversion layer, it should be understood that locations of the two parts of network layers in the neural network are not limited. For example, the extraction layer may be located after or before the conversion layer. To be specific, the neural network may first perform an operation of extracting the image detail information, and then perform an operation of converting the low resolution into the high resolution; may first perform an operation of converting the low resolution into the high resolution, and then perform an operation of extracting the image detail information; or may perform an operation of converting the low resolution into the high resolution after completing a partial operation of extracting the image detail information, and then perform a remaining operation of extracting the image detail information.

For example, the following provides two examples of implementing the neural network in this embodiment of this application by using a neural network applied to an image in an RBG format as an example.

TABLE 3

| Layer | Length × width × input channel × quantity of convolution kernels | Convolution stride | Function |
| --- | --- | --- | --- |
| Convolutional layer 1 (conv1) | 3 × 3 × 3 × 16 | 1 | The image detail information is extracted |
| Convolutional layer 2 (conv2) | 3 × 3 × 16 × 32 | 1 | The image detail information is extracted |
| Convolutional layer 3 (conv3) | 3 × 3 × 32 × 16 | 1 | The image detail information is extracted |
| Convolutional layer 4 (conv4) | 3 × 3 × 16 × 16 | 1 | The image detail information is extracted |
| Deconvolution 1 (deconv1) | 3 × 3 × 16 × 3 | 3 | The low resolution is converted into the high resolution |

The length×the width in the foregoing table is used to represent a size of a convolution kernel used by the convolutional layer. A size of an input channel at each layer may be determined based on a quantity of convolution kernels at an upper layer. Each input channel at a first layer corresponds to one channel of the image in the RBG format.

TABLE 4

| Layer | Length × width × input channel × quantity of convolution kernels | Convolution stride | Function |
| --- | --- | --- | --- |
| Convolutional layer 1 (conv1) | 3 × 3 × 3 × 16 | 1 | The image detail information is extracted |
| Deconvolution layer 1 (deconv1) | 3 × 3 × 16 × 32 | 3 | The low resolution is converted into the high resolution |
| Convolutional layer 2 (conv2) | 3 × 3 × 32 × 16 | 1 | The image detail information is extracted |
| Convolutional layer 3 (conv3) | 3 × 3 × 16 × 16 | 1 | The image detail information is extracted |
| Convolutional layer 4 (conv4) | 3 × 3 × 16 × 3 | 1 | The image detail information is extracted |

It can be learned from Table 3 and Table 4 that, in the neural network shown in Table 3, the operation of extracting the image detail information is first performed, and then the operation of converting the low resolution into the high resolution is performed. In the neural network shown in Table 4, after the partial operation of extracting the image detail information is performed, the operation of converting the low resolution into the high resolution is performed, and then the remaining operation of extracting the image detail information is performed.

Although both neural networks of the two structures can reconstruct the second high-resolution image based on the second low-resolution image, Table 3 shows that the operation of extracting the image detail information is performed based on the low-resolution image, and Table 4 shows that the partial operation of extracting the image detail information in the neural network is performed based on the high-resolution image. Because a data amount of the high-resolution image is greater than a data amount of the low-resolution image, when the neural network shown in Table 4 reconstructs the second high-resolution image based on the second low-resolution image, a larger computation amount is occupied compared with a computation amount of the neural network shown in Table 3, but the extracted image detail information is more accurate. Therefore, in a specific implementation, a specific architecture of the neural network may be selected based on an actual requirement. It may be understood that although the foregoing example provides an example of the neural network applied to the image in the RBG format, a structure of a neural network corresponding to an image in a specific format is not limited in this embodiment of this application.

After the architecture of the neural network is determined, the neural network may be trained, for example, in the following manner, to obtain the parameters of the convolution kernels: First, a training set for training the neural network is constructed, where the training set may include S groups of samples, and each group of samples includes a frame of input image X and a frame of label image Y. The input image X is a low-resolution image, and the label image Y is to-be-achieved target output after the low-resolution image is input into the neural network. S is an integer greater than or equal to 1.

The S groups of samples may be obtained by using S high-resolution images. Specifically, an $i^{th}$ high-resolution image is used as an example, resolution conversion may be performed on the $i^{th}$ high-resolution image to obtain a low-resolution image corresponding to the $i^{th}$ high-resolution image. The low-resolution image is an input image Xi. i is an integer greater than 0 and less than or equal to S.

In addition, frequency domain conversion (for example, Fourier transform, wavelet transform, or another space-domain-to-frequency-domain method) may be performed on the $i^{th}$ high-resolution image to obtain frequency domain information of the $i^{th}$ high-resolution image. Then, the frequency domain information of the $i^{th}$ high-resolution image may be extracted (for example, the frequency domain information is extracted by using a high-pass filter) to obtain high-frequency information of the $i^{th}$ high-resolution image. Finally, the high-frequency information of the $i^{th}$ high-resolution image is converted into an image. For example, the high-frequency information may be converted into the image in a frequency-domain-to-space-domain manner. For example, the high-frequency information of the $i^{th}$ high-resolution image may be converted into the image through inverse Fourier transform. In this case, the obtained image is a label image Yi of the input image Xi. A frequency of the foregoing high-frequency information is greater than or equal to a preset frequency threshold. It should be understood that the high-frequency information described herein is the image detail information. The preset frequency threshold may be determined based on an actual requirement.

Second, an objective function of the neural network is constructed. An objective of training the neural network is to continuously adjust and optimize the parameters of the convolution kernels, so that an image Y' output by the neural network based on the input image X is similar to the label image Y as much as possible. Therefore, the target function of the neural network may be defined as, for example, $\min\|Y-Y'\|2$.

Finally, the neural network is trained by using the constructed training set and the target function, until a value of the target function is less than or equal to a preset threshold. For how to train the neural network by using the constructed training set and the target function, refer to the conventional technology. Details are not described herein. In this case, the trained neural network model may be applied to the sender and the receiver, to reconstruct the second high-resolution image by using the second low-resolution image.

It should be understood that the neural network model described in the foregoing example and the manner of training the neural network model are merely examples. Because there are a plurality of image formats, neural networks applied to images in various formats are not listed one by one herein. In a specific implementation, a person skilled in the art may construct and train a corresponding neural network based on a format of an image that needs to be processed and the task objective "constructing, by using a low-resolution image, a high-resolution image covering image detail information" that needs to be implemented by the neural network, to implement the foregoing functions. Details are not described herein again.

In addition, although the neural network model is used as an example in all the foregoing embodiments to describe how to reconstruct the second high-resolution image by using the second low-resolution image, a person skilled in the art may understand that another artificial intelligence (AI) model may be used to replace the foregoing neural network to implement a function of reconstructing the second high-resolution image by using the second low-resolution image. Details are not described herein again. The neural network in this embodiment includes but is not limited to a convolutional neural network.

For example, the sender may use the NPU 35 of the sender to reconstruct the second high-resolution image by using the second low-resolution image, and use the neural network to reconstruct the second high-resolution image. Alternatively, the sender may reconstruct the second high-resolution image by using the second low-resolution image, the GPU (not shown in FIG. 3) of the sender, and the neural network. Alternatively, the sender may reconstruct the second high-resolution image by using the second low-resolution image, the processor 31 of the sender, and the neural network. Alternatively, the sender may reconstruct the second high-resolution image by using the second low-resolution image, the processor 31 and the GPU of the sender, and the neural network. Correspondingly, the receiver may also be implemented in a similar manner. Details are not described herein again.

Manner 2: The sender may perform resolution conversion on the second low-resolution image to obtain a high-resolution image (for example, a sixth high-resolution image). Then, the sender may perform frequency domain conversion on the sixth high-resolution image to obtain frequency domain information of the sixth high-resolution image. Then, the sender may extract the frequency domain information of the sixth high-resolution image to obtain high-frequency information of the sixth high-resolution image. Finally, the sender may convert the high-frequency information of the sixth high-resolution image into the second high-resolution image. For how to implement frequency domain conversion, extract the frequency domain information, and convert the high-frequency information into the image, refer to content in constructing a sample set for training the neural network. Details are not described herein again. Correspondingly, the receiver may also reconstruct the second high-resolution image by using the second resolution image in this manner.

For example, the sender may obtain the second high-resolution image in this manner by using the GPU (not shown in FIG. 3) of the sender. Alternatively, the sender may obtain the second high-resolution image in this manner by using the processor 31 of the sender. Alternatively, the sender may obtain the second high-resolution image or the like in this manner by using the processor 31 and the GPU of the sender. Correspondingly, the receiver may also be implemented in a similar manner. Details are not described herein again.

It should be understood that the foregoing example is merely an example of reconstructing the second high-resolution image by using the second low-resolution image. A person skilled in the art may also use the second low-resolution image to reconstruct the second high-resolution image in another manner. This is not limited.

Optionally, in some embodiments, the sender may directly reconstruct the second high-resolution image by using the first low-resolution image. For example, the sender may input the first low-resolution image into the neural network to obtain the second high-resolution image. Correspondingly, the receiver may input the second low-resolution image into the neural network to obtain the second high-resolution image. For example, the sender may obtain the second high-resolution image in this manner by using the GPU (not shown in FIG. 3) of the sender. Alternatively, the sender may obtain the second high-resolution image in this manner by using the processor 31 of the sender. Alternatively, the sender may obtain the second high-resolution image or the like in this manner by using the processor 31 and the GPU of the sender. Correspondingly, the receiver may also be implemented in a similar manner. Details are not described herein again.

Alternatively, the sender may first convert the first low-resolution image into a seventh high-resolution image, and extract high-frequency information of the seventh high-resolution image to obtain the second high-resolution image. Correspondingly, the receiver may convert the second low-resolution image into an eighth high-resolution image, and extract high-frequency information of the eighth high-resolution image to obtain the second high-resolution image. For example, the sender may obtain the second high-resolution image in this manner by using the GPU (not shown in FIG. 3) of the sender. Alternatively, the sender may obtain the second high-resolution image in this manner by using the processor 31 of the sender. Alternatively, the sender may obtain the second high-resolution image or the like in this manner by using the processor 31 and the GPU of the sender. Correspondingly, the receiver may also be implemented in a similar manner. Details are not described herein again.

In some other embodiments, the sender may further reconstruct the second high-resolution image by using the first high-resolution image, for example, may extract the high-frequency information of the first high-resolution image to obtain the second high-resolution image. Correspondingly, the receiver may convert the second low-resolution image into a seventh high-resolution image, and extract high-frequency information of the seventh high-resolution image to obtain the second high-resolution image. For example, the sender may obtain the second high-resolution image in this manner by using the GPU (not shown in FIG. 3) of the sender. Alternatively, the sender may obtain the second high-resolution image in this manner by using the processor 31 of the sender. Alternatively, the sender may obtain the second high-resolution image or the like in this manner by using the processor 31 and the GPU of the sender. Correspondingly, the receiver may also be implemented in a similar manner. Details are not described herein again.

Figure 10:
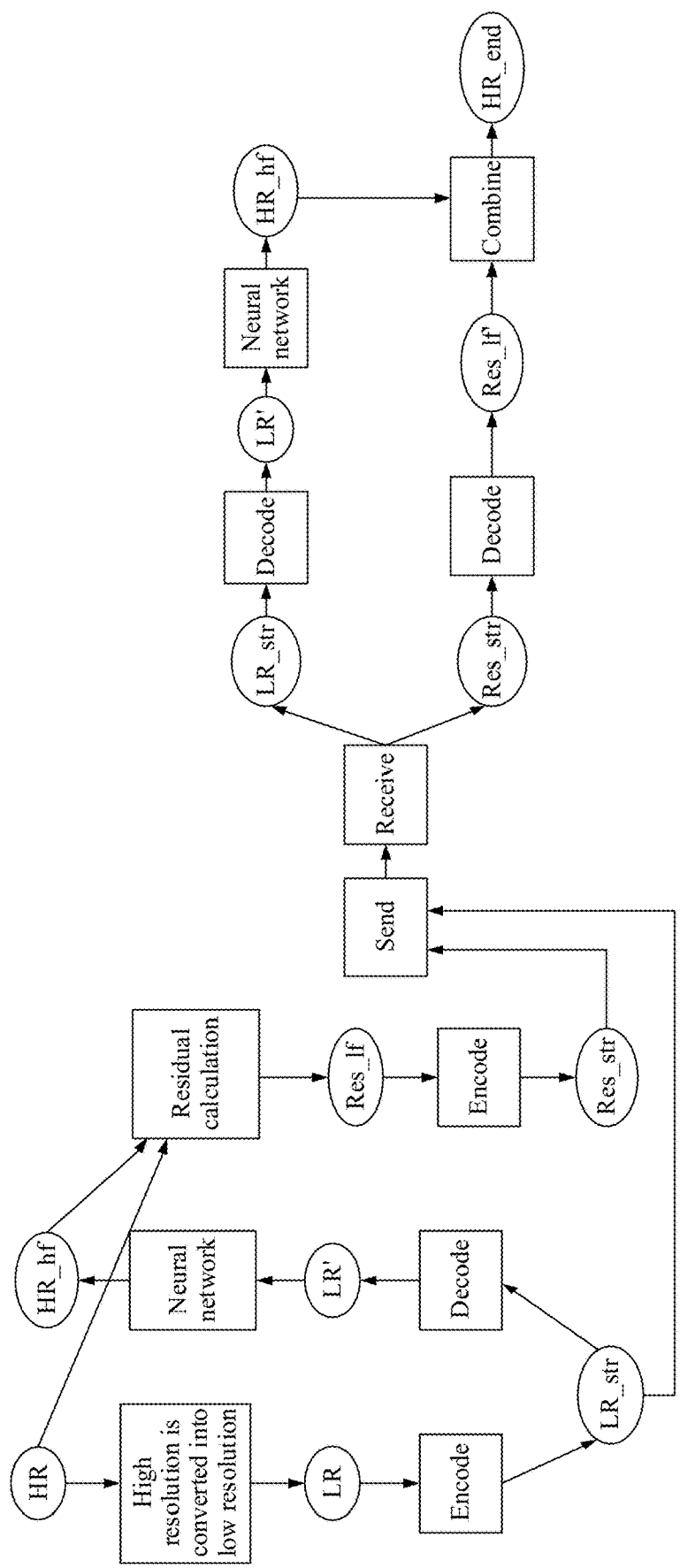
FIG. 10 is a schematic flowchart of video transmission according to an embodiment of this application.

The following describes how to transmit a video by using an example in which an image transmission method provided in an embodiment of this application is applied to video transmission. FIG. 10 is a schematic flowchart of video transmission according to an embodiment of this application. As shown in FIG. 10, the method includes the following steps. (1) A sender converts a to-be-transmitted high-resolution video HR to a low-resolution video LR. Resolution of the original high-resolution video HR is higher than resolution of the low-resolution video LR. The to-be-transmitted high-resolution video HR may also be referred to as the original high-resolution video, and the resolution of the to-be-transmitted high-resolution video HR may be, for example, 4K or 8K.

(2) The sender encodes the low-resolution video LR to obtain a bitstream LR_str of the low-resolution video LR. For example, the sender encodes the low-resolution video LR by using a general encoding and decoding protocol.

(3) The sender decodes the bitstream LR_str of the low-resolution video LR to obtain a decoded low-resolution video LR'. Resolution of the decoded low-resolution video LR' is the same as the resolution of the low-resolution video LR.

(4) The sender inputs the decoded low-resolution video LR' to a neural network to obtain a high-resolution video HR_hf output by the neural network. The high-resolution video HR_hf includes high-frequency information of images in the high-resolution video HR, and excludes low-frequency information of the images in the high-resolution video HR.

(5) The sender obtains a video residual Res_lf between the high-resolution video HR and the high-resolution video HR_hf. The video residual Res_lf is used to reflect the low-frequency information of the images in the high-resolution video HR. For example, the resolution of the high-resolution video HR is the same as resolution of the high-resolution video HR_hf. The sender may subtract pixel values of first pixels of the images in the high-resolution video HR from a pixel value of a second pixel in the high-resolution video HR_hf corresponding to the first pixel, to obtain a first pixel residual in the video residual Res_lf.

(6) The sender encodes the video residual Res_lf to obtain a bitstream Res_str of the video residual Res_lf. For example, the sender encodes the video residual Res_lf by using a general encoding and decoding protocol. Alternatively, the sender encodes the video residual Res_lf by using an independent encoding scheme, for example, entropy encoding and an autoencoding network.

(7) The sender sends the bitstream LR_str of the low-resolution video LR and the bitstream Res_str of the video residual Res_lf. Correspondingly, a receiver receives the bitstream LR_str and the bitstream Res_str.

(8) The receiver decodes the bitstream LR_str to obtain the decoded low-resolution video LR'. A decoding scheme used by the receiver to decode the bitstream LR_str is related to an encoding scheme used by the sender to encode the low-resolution video LR. To be specific, when the sender encodes the low-resolution video LR by using an encoding scheme of a specific protocol, the receiver needs to correspondingly decode the bitstream LR_str by using a decoding scheme of the protocol. Details are not described herein again.

(9) The receiver inputs the decoded low-resolution video LR' to the neural network to obtain the high-resolution video HR_hf output by the neural network. It should be understood that a neural network deployed at the receiver is the same as or at least approximately the same as a neural network deployed at the sender in terms of functions.

(10) The receiver decodes the bitstream Res_str to obtain a decoded video residual Res_lf'. A decoding scheme used by the receiver to decode the bitstream Res_str is related to the encoding scheme used by the sender to encode the video residual Res_lf. To be specific, when the sender encodes the video residual Res_lf by using an encoding scheme of a specific protocol, the receiver needs to correspondingly decode the bitstream Res_str by using a decoding scheme of the protocol. Details are not described herein again.

(11) The receiver combines the high-resolution video HR_hf and the decoded video residual Res_lf' to restore a third high-resolution video HR_end. For example, the receiver adds a pixel value of a second pixel in the high-resolution video HR_hf to a pixel residual in the video residual Res_lf' corresponding to the second pixel, to obtain a third pixel in the third high-resolution video HR_end corresponding to the second pixel.

Although the foregoing uses an example in which the resolution of the high-resolution video HR is the same as the resolution of the high-resolution video HR_hf to describe how the sender obtains the video residual Res_lf and how the receiver restores the high-resolution video HR_end by using the video residual Res_lf, it should be understood that, when the resolution of the high-resolution video HR is different from the resolution of the high-resolution video HR_hf, the sender may obtain the video residual Res_lf after converting the resolution of one of the videos. Correspondingly, when restoring the high-resolution video HR_end based on the decoded video residual Res_lf', the receiver also needs to perform a corresponding resolution conversion operation. For details, refer to the foregoing description that the first resolution of the first high-resolution image is different from the third resolution of the second high-resolution image, an implementation and a principle thereof are similar. Details are not described herein again.

In addition, in the example shown in FIG. 10, an example in which the high-resolution video HR_hf is reconstructed by using the neural network is used to describe how to transmit a high-resolution video. It should be understood that this part of content is also implemented in the foregoing second manner of "reconstructing the second high-resolution image by using the second low-resolution image". An implementation and a principle thereof are similar. Details are not described herein again.

Similarly, transmission of a 4K video is used as an example. In this example, it is assumed that the sender processes the 4K video to obtain a 720p video and a 4K video residual C#. The 4K video residual C# is used to reflect image outline information of images in the 4K video (that is, used to reflect low-frequency information of the images in the 4K video). Compared with a 4K video residual used to reflect the low-frequency information and high-frequency information of the images in the 4K video, the 4K video residual C# includes a small amount of data. Therefore, when the 4K video residual C# in this embodiment is encoded, a large compression ratio may be used, for example, the compression ratio may reach 500 times.

In this example, it can be learned from a calculation method of a formula (1) that the following transmission bit rate required for transmitting the 720p video B is:

(1280×720×1.5×8)×30/50/1024/1024=6.3 Mbps.

A transmission bit rate required for transmitting the 4K video residual C# is:

(3840×2160×1.5×8)×30/500/1024/1024=5.7 Mbps.

A sum of the two transmission bit rates is 12 Mbps. To be specific, when the 4K video is transmitted by using the solution shown in FIG. 10, a transmission bit rate of the sender needs to reach 12 Mbps. Correspondingly, when receiving the 4K video, the receiver also needs to use the transmission bit rate of 12 Mbps.

It can be learned from this example that, when a high-resolution video is transmitted in the manner shown in FIG. 10, that is, when the high-resolution video is transmitted after being converted into a low-resolution video and a video residual used to reflect low-frequency information of images in the high-resolution video, because a transmission bit rate of the low-resolution video is far lower than a bit rate of the high-resolution video, and a data amount of the video residual used to reflect the low-frequency information of the images in the high-resolution video is small, a high compression ratio may be used for encoding, the high-resolution video can be transmitted by using only a low transmission bit rate, and the required transmission bit rate is within a transmission bit rate range supported by most transmission devices. Therefore, an application scenario of transmitting the high-resolution video in real time can be met, the high-resolution video is transmitted without a delay, and transmission efficiency is improved.

In addition, because the encoded and decoded low-resolution video LR' is used at both the sender and the receiver, the high-resolution video HR_hf that includes image detail information of the images in the high-resolution video HR is obtained. Therefore, the high-resolution video HR_hf obtained by the sender is completely the same as the high-resolution video HR_hf obtained by the receiver. Because the sender uses the high-resolution video HR_hf to calculate the video residual, and the receiver uses the decoded video residual to refine the high-resolution video HR_hf, the receiver may eliminate encoding and decoding losses of the low-resolution video LR by using the video residual, so that only encoding and decoding losses of the video residual exist on an entire transmission path, and the encoding and decoding losses of the low-resolution video LR no longer exist on the transmission path. This improves video transmission quality.

The foregoing embodiment focuses on how to decompose, for transmission, a high-resolution image into a low-resolution image and an image residual used to reflect low-frequency information of the high-resolution image, to reduce a transmission bit rate of content of the high-resolution image. In the following, an embodiment of this application further provides another image transmission method. Although the method is also to decompose a high-resolution image into a low-resolution image and an image residual for transmission, the method focuses on how to eliminate a loss in a process of transmitting the low-resolution image. In this embodiment, the transmitted image residual may be an image residual used to reflect low-frequency information of the high-resolution image, an image residual used to reflect low-frequency information and high-frequency information of the high-resolution image, or an image residual used to reflect high-frequency information of the high-resolution image. This is not limited herein.

Figure 11:
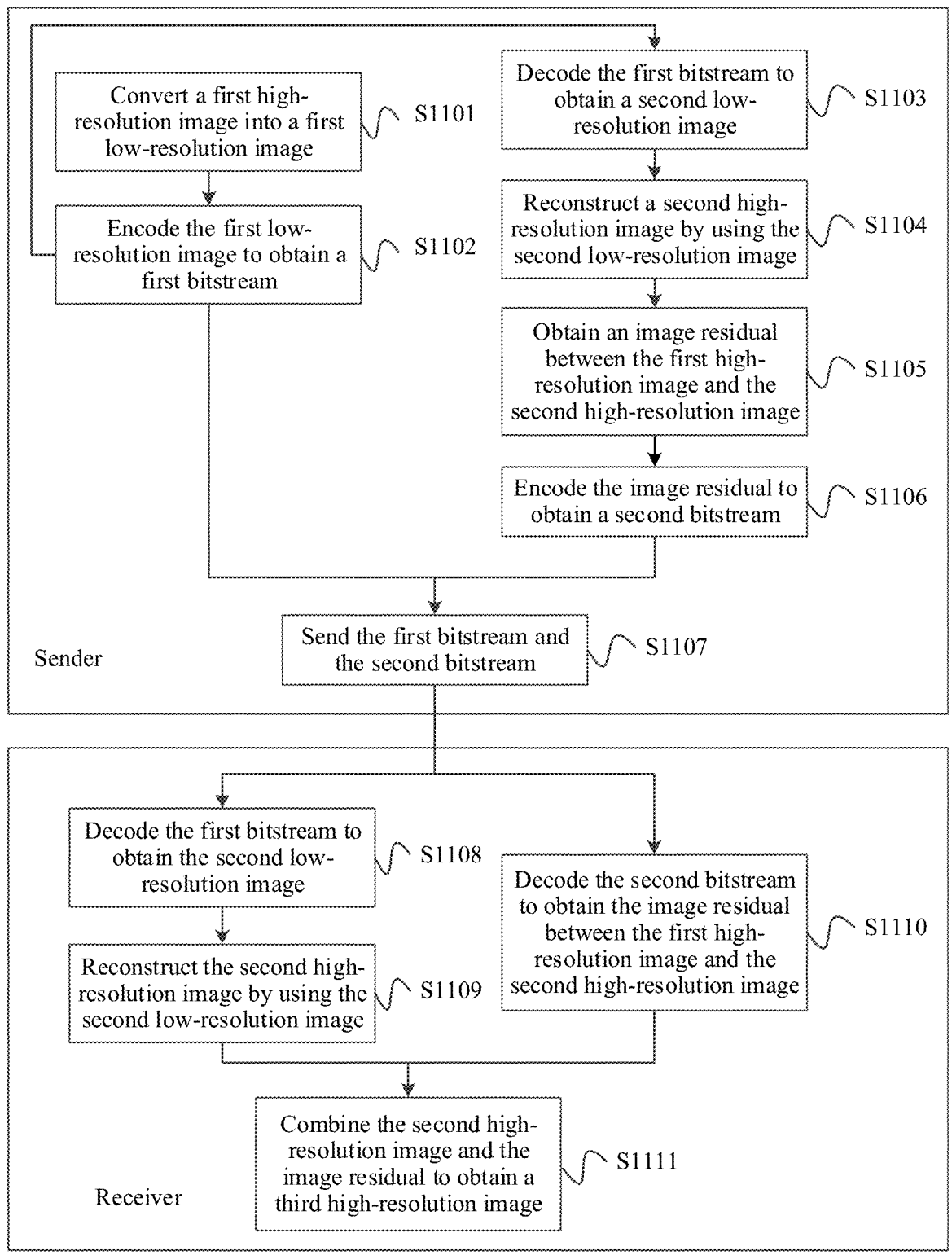
FIG. 11 is a schematic flowchart of another image transmission method according to an embodiment of this application.

FIG. 11 is a schematic flowchart of another image transmission method according to an embodiment of this application. As shown in FIG. 11, the method may include the following steps. S1101: A sender converts a first high-resolution image into a first low-resolution image. First resolution of the first high-resolution image is higher than second resolution of the first low-resolution image. S1102: The sender encodes the first low-resolution image to obtain a first bitstream. For example, the sender encodes the first low-resolution image by using a lossy encoding scheme to obtain the first bitstream.

S1103: The sender decodes the first bitstream to obtain a second low-resolution image. S1104: The sender reconstructs a second high-resolution image by using the second low-resolution image. Third resolution of the second high-resolution image is higher than the second resolution. Optionally, the second high-resolution image may include image detail information and image outline information of the first high-resolution image, only image detail information of the first high-resolution image, only outline information of the first high-resolution image, or the like. This is not limited in this embodiment of this application.

S1105: The sender obtains an image residual between the first high-resolution image and the second high-resolution image. S1106: The sender encodes the image residual to obtain a second bitstream. For example, the image residual is encoded by using the lossy encoding scheme or a lossless encoding scheme.

S1107: The sender sends the first bitstream and the second bitstream. S1108: The receiver decodes the first bitstream to obtain the second low-resolution image. S1109: The receiver reconstructs the second high-resolution image by using the second low-resolution image.

S1110: The receiver decodes the second bitstream to obtain the image residual between the first high-resolution image and the second high-resolution image. S1111: The receiver combines the second high-resolution image and the image residual to obtain a third high-resolution image. For implementations of the foregoing steps and explanations of technical features, refer to related description in the foregoing embodiment. Details are not described herein again.

In this embodiment, in a manner in which the sender obtains the second high-resolution image by using the decoded second low-resolution image, the second high-resolution image obtained by the sender covers encoding and decoding losses of the first low-resolution image in a transmission process. The image residual obtained by the sender based on the second high-resolution image and the first high-resolution image also covers the encoding and decoding losses of the first low-resolution image in the transmission process. In this way, after obtaining the second high-resolution image based on the second low-resolution image, the receiver may eliminate the loss of the first low-resolution image in the transmission process when combining the second high-resolution image and the image residual obtained through decoding. In this case, only a transmission loss of the image residual exists on a path. This reduces a loss (for example, only the loss of the image residual) of the third high-resolution image restored by the receiver, and there is even no loss for the third high-resolution image (for example, a scenario in which the image residual is encoded by using the lossless encoding scheme). This improves image quality. When the method is used to transmit the high-resolution video, image quality of the high-resolution video can be improved, and user experience is improved.

Figure 12:
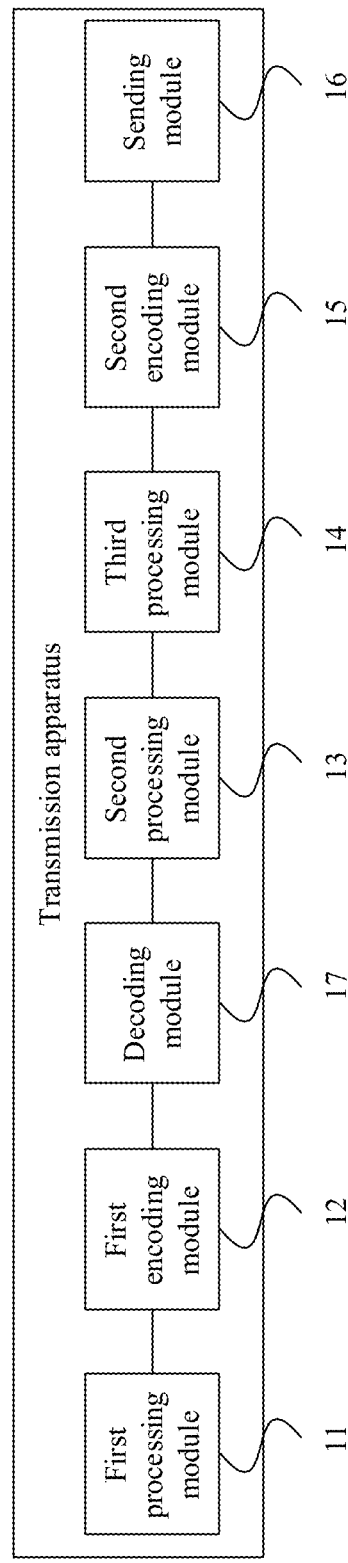
FIG. 12 is a schematic diagram of a structure of a transmission apparatus according to an embodiment of this application.

To further illustrate the technical effect, FIG. 12 is a schematic diagram of a structure of a transmission apparatus according to an embodiment of this application. It may be understood that the transmission apparatus may correspondingly implement operations or steps of the sender in the foregoing method embodiments. The transmission apparatus may be a sender, or may be a component, for example, a chip, that may be configured at a sender. As shown in FIG. 12, the transmission apparatus may include a first processing module 11, a first encoding module 12, a second processing module 13, a third processing module 14, a second encoding module 15, and a sending module 16. Optionally, in some embodiments, the transmission apparatus may further include a decoding module 17.

In a possible implementation, the first processing module 11 is configured to convert a first high-resolution image into a first low-resolution image. First resolution of the first high-resolution image is higher than second resolution of the first low-resolution image. The first encoding module 12 is configured to encode the first low-resolution image to obtain a first bitstream. The second processing module 13 is configured to obtain a second high-resolution image. Third resolution of the second high-resolution image is higher than the second resolution, and the second high-resolution image includes high-frequency information of the first high-resolution image and excludes low-frequency information of the first high-resolution image. The third processing module 14 is configured to obtain an image residual between the first high-resolution image and the second high-resolution image. The image residual is used to reflect the low-frequency information. The second encoding module 15 is configured to encode the image residual to obtain a second bitstream. The sending module 16 is configured to send the first bitstream and the second bitstream.

It should be understood that the high-frequency information is image detail information and the low-frequency information is image outline information. In the first high-resolution image, the image detail information changes more rapidly than the image outline information.

In a possible implementation, the decoding module 17 is configured to decode the first bitstream to obtain a second low-resolution image. The second processing module 13 is specifically configured to reconstruct the second high-resolution image by using the second low-resolution image. For example, the second processing module 13 is specifically configured to reconstruct the second high-resolution image by using the second low-resolution image and a neural network.

In a possible implementation, the first resolution and the third resolution are the same, and the third processing module 14 is specifically configured to subtract a pixel value of a first pixel in the first high-resolution image from a pixel value of a second pixel in the second high-resolution image corresponding to the first pixel, to obtain a first pixel residual in the image residual. Alternatively, the first resolution is higher than the third resolution, and the third processing module 14 is specifically configured to: convert the second high-resolution image into a fourth high-resolution image, and subtract a pixel value of a first pixel in the first high-resolution image from a pixel value of a third pixel in the fourth high-resolution image corresponding to the first pixel, to obtain a second pixel residual in the image residual. The fourth high-resolution image has the first resolution.

In a possible implementation, the first encoding module 12 is specifically configured to encode the first low-resolution image by using a lossy encoding scheme.

In a possible implementation, the second encoding module 15 is specifically configured to encode the image residual by using the lossy encoding scheme.

In a possible implementation, the second encoding module 15 is specifically configured to encode the image residual by using a lossless encoding scheme.

In a possible implementation, the apparatus is applied to video transmission, and the first high-resolution image is a frame of image in a video.

The transmission apparatus provided in this embodiment can execute actions of the sender in the method embodiments corresponding to FIG. 4 and FIG. 8. Implementation principles and technical effects thereof are similar. Details are not described herein again.

In another embodiment, the first processing module 11 is configured to convert a first high-resolution image into a first low-resolution image. First resolution of the first high-resolution image is higher than second resolution of the first low-resolution image. The first encoding module 12 is configured to encode the first low-resolution image (for example, encode the first low-resolution image by using a lossy encoding scheme) to obtain a first bitstream. The decoding module 17 is configured to decode the first bitstream to obtain a second low-resolution image. The second processing module 13 is configured to reconstruct a second high-resolution image by using the second low-resolution image. Third resolution of the second high-resolution image is higher than the second resolution. The third processing module 14 is configured to obtain an image residual between the first high-resolution image and the second high-resolution image. The second encoding module 15 is configured to encode the image residual to obtain a second bitstream. The sending module 16 is configured to send the first bitstream and the second bitstream.

In a possible implementation, the second processing module 13 is specifically configured to reconstruct the second high-resolution image by using the second low-resolution image and a neural network.

In a possible implementation, the first resolution and the third resolution are the same, and the third processing module 14 is specifically configured to subtract a pixel value of a first pixel in the first high-resolution image from a pixel value of a second pixel in the second high-resolution image corresponding to the first pixel, to obtain a first pixel residual in the image residual. Alternatively, the first resolution is higher than the third resolution, and the third processing module 14 is specifically configured to: convert the second high-resolution image into a fourth high-resolution image, and subtract a pixel value of a first pixel in the first high-resolution image from a pixel value of a third pixel in the fourth high-resolution image corresponding to the first pixel, to obtain a second pixel residual in the image residual. The fourth high-resolution image has the first resolution.

In a possible implementation, the second encoding module 15 is specifically configured to encode the image residual by using the lossy encoding scheme.

In a possible implementation, the second encoding module 15 is specifically configured to encode the image residual by using a lossless encoding scheme.

In a possible implementation, the apparatus is applied to video transmission, and the first high-resolution image is a frame of image in a video.

The transmission apparatus provided in this embodiment can execute actions of the sender in the method embodiment corresponding to FIG. 11. Implementation principles and technical effects thereof are similar. Details are not described herein again.

Optionally, the foregoing apparatus may further include at least one storage module. The storage module may include data and/or instructions. The modules may read the data and/or the instructions in the storage module to implement a corresponding method.

Figure 13:
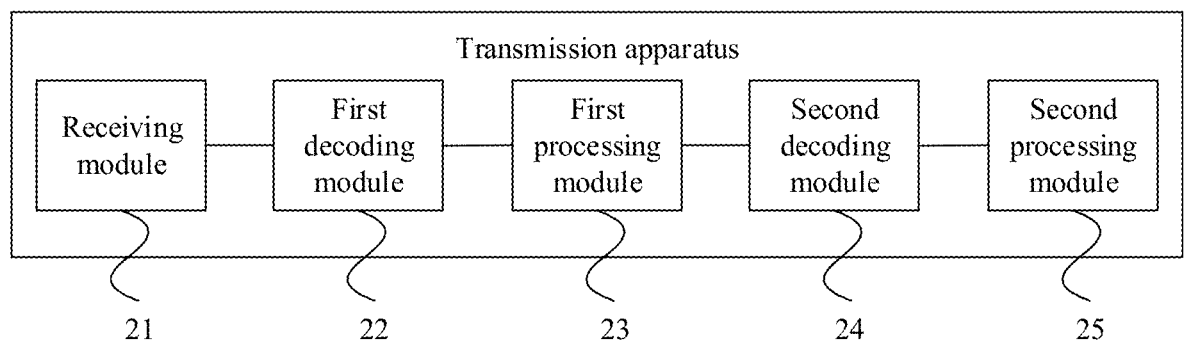
FIG. 13 is a schematic diagram of a structure of another transmission apparatus according to an embodiment of this application.

To further illustrate the technical effect, FIG. 13 is a schematic diagram of a structure of another transmission apparatus according to an embodiment of this application. It may be understood that the transmission apparatus may correspondingly implement operations or steps of the receiver in the foregoing method embodiments. The transmission apparatus may be a receiver, or may be a component, for example, a chip, that may be configured at a receiver. As shown in FIG. 13, the transmission apparatus may include a receiving module 21, a first decoding module 22, a first processing module 23, a second decoding module 24, and a second processing module 25.

The receiving module 21 is configured to receive a first bitstream and a second bitstream. The first decoding module 22 is configured to decode the first bitstream to obtain a second low-resolution image. The first processing module 23 is configured to reconstruct a second high-resolution image by using the second low-resolution image. First resolution of the second high-resolution image is higher than second resolution of the second low-resolution image, and the second high-resolution image includes high-frequency information of a first high-resolution image and excludes low-frequency information of the first high-resolution image. The second decoding module 24 is configured to decode the second bitstream to obtain an image residual between the first high-resolution image and the second high-resolution image. The image residual is used to reflect the low-frequency information. The second processing module 25 is configured to combine the second high-resolution image and the image residual to obtain a third high-resolution image.

It should be understood that the high-frequency information is image detail information and the low-frequency information is image outline information. In the first high-resolution image, the image detail information changes more rapidly than the image outline information.

In a possible implementation, the first processing module 23 is specifically configured to reconstruct the second high-resolution image by using the second low-resolution image and a neural network.

In a possible implementation, the second processing module 25 is specifically configured to add a pixel value of a second pixel in the second high-resolution image to a pixel residual in the image residual corresponding to the second pixel, to obtain a third pixel in the third high-resolution image corresponding to the second pixel.

In a possible implementation, the apparatus is applied to video transmission, and the first high-resolution image is a frame of image in a video.

The transmission apparatus provided in this embodiment can execute actions of the receiver in the method embodiment. Implementation principles and technical effects thereof are similar. Details are not described herein again.

Optionally, the foregoing apparatus may further include at least one storage module. The storage module may include data and/or instructions. The modules may read the data and/or the instructions in the storage module to implement a corresponding method.

The modules in FIG. 12 and FIG. 13 may be implemented by software, hardware, or a combination thereof. For example, in the foregoing embodiments, the sending module may be a transmitter in an actual implementation, and the receiving module may be a receiver in an actual implementation. Alternatively, the sending module and the receiving module are implemented by using a transceiver, or the sending module and the receiving module are implemented by using a communications interface. The processing module may be implemented in a form of software invoked by a processing element, or in a form of hardware. For example, the processing module may be at least one separately disposed processing element, or may be integrated into a chip of the foregoing apparatus for implementation. In addition, the processing module may be stored in a memory of the foregoing apparatus in a form of program code, and may be invoked by a processing element of the foregoing apparatus to perform a function of the foregoing processing module. In addition, all or some of the modules may be integrated together, or may be implemented independently. The processing element herein may be an integrated circuit and has a signal processing capability. In an implementation process, steps in the foregoing methods or the foregoing modules can be implemented by using a hardware integrated logical circuit in the processing element, or by using instructions in a form of software.

To be specific, the foregoing modules may be configured as one or more integrated circuits for performing the foregoing methods, for example, one or more application specific integrated circuits (ASIC), one or more microprocessors (DSP), or one or more field programmable gate arrays (FPGA). For another example, when one of the foregoing modules is implemented by scheduling program code by a processing element, the processing element may be a general-purpose processor, for example, a central processing unit (CPU) or another processor that can invoke the program code. For another example, these modules may be integrated together, and implemented in a form of a system-on-a-chip (SOC).

This application further provides the transmission device 100 shown in FIG. 3. The processor system 102 in the transmission device 100 reads a program and a data set that are stored in the memory 101, to perform the foregoing image transmission method.

An embodiment of this application further provides a computer-readable storage medium. The computer-readable storage medium stores computer instructions used to implement the method performed by the sender or the method performed by the receiver in the foregoing method embodiments. For example, when the computer instructions are executed, a transmission apparatus can implement the method performed by the sender or the method performed by the receiver in the foregoing method embodiments.

An embodiment of this application further provides a computer program product including instructions. When the instructions are executed, a computer is enabled to implement the method performed by the sender or the method performed by the receiver in the foregoing method embodiments.

An embodiment of this application further provides a transmission system. The transmission system includes the sender and/or the receiver in the foregoing embodiments.

In an example, the transmission system includes the sender and the receiver in the foregoing embodiment corresponding to FIG. 4 or FIG. 9.

In another example, the transmission system includes the foregoing transmission apparatus described with reference to FIG. 12 and the transmission apparatus described with reference to FIG. 13.

In another example, the transmission system includes the transmission device described with reference to FIG. 3.

All or some of foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on a computer, the procedures or functions according to embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It may be understood that various numbers in embodiments of this application are merely used for differentiation for ease of description, and are not used to limit the scope of embodiments of this application.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

The invention claimed is:

1. An image transmission method, wherein the method comprises:
    converting a first high-resolution image into a first low-resolution image, wherein first resolution of the first high-resolution image is higher than second resolution of the first low-resolution image;
    encoding the first low-resolution image to obtain a first bitstream;
    obtaining a second high-resolution image, wherein a third resolution of the second high-resolution image is higher than the second resolution, and the second high-resolution image comprises high-frequency information of the first high-resolution image and excludes low-frequency information of the first high-resolution image;
    obtaining an image residual between the first high-resolution image and the second high-resolution image, wherein the image residual is used to reflect the low-frequency information;
    encoding the image residual to obtain a second bitstream; and
    sending the first bitstream and the second bitstream.

2. The method according to claim 1, wherein the high-frequency information is image detail information and the low-frequency information is image outline information.

3. The method according to claim 1, wherein the obtaining a second high-resolution image comprises:
    decoding the first bitstream to obtain a second low-resolution image; and
    reconstructing the second high-resolution image by using the second low-resolution image.

4. The method according to claim 3, wherein the reconstructing the second high-resolution image by using the second low-resolution image comprises:
    reconstructing the second high-resolution image by using the second low-resolution image and a neural network.

5. The method according to claim 1, wherein the first resolution and the third resolution are the same; and the obtaining an image residual between the first high-resolution image and the second high-resolution image comprises:
    subtracting a pixel value of a first pixel in the first high-resolution image from a pixel value of a second pixel in the second high-resolution image corresponding to the first pixel, to obtain a first pixel residual in the image residual.

6. The method according to claim 1, wherein the method is applied to video transmission, and the first high-resolution image is a frame of image in a video.

7. An image transmission method, wherein the method comprises:
- receiving a first bitstream and a second bitstream;
- decoding the first bitstream to obtain a second low-resolution image;
- reconstructing a second high-resolution image by using the second low-resolution image, wherein first resolution of the second high-resolution image is higher than second resolution of the second low-resolution image, and the second high-resolution image comprises high-frequency information of a first high-resolution image and excludes low-frequency information of the first high-resolution image;
- decoding the second bitstream to obtain an image residual between the first high-resolution image and the second high-resolution image, wherein the image residual is used to reflect the low-frequency information; and
- combining the second high-resolution image and the image residual to obtain a third high-resolution image.

8. The method according to claim 7, wherein the high-frequency information is image detail information and the low-frequency information is image outline information.

9. The method according to claim 7, wherein the reconstructing a second high-resolution image by using the second low-resolution image comprises:
- reconstructing the second high-resolution image by using the second low-resolution image and a neural network.

10. The method according to claim 7, wherein the combining the second high-resolution image and the image residual to obtain a third high-resolution image comprises:
- adding a pixel value of a second pixel in the second high-resolution image to a pixel residual in the image residual corresponding to the second pixel, to obtain a third pixel in the third high-resolution image corresponding to the second pixel.

11. The method according to claim 7, wherein the method is applied to video transmission, and the first high-resolution image is a frame of image in a video.

12. A transmission apparatus, wherein the apparatus comprises: a processor system and a memory, wherein the memory is configured to store computer executable program code, and the program code includes instructions executed by the processor system to enable the transmission device to perform an image transmission method, comprising:
- converting a first high-resolution image into a first low-resolution image, wherein first resolution of the first high-resolution image is higher than second resolution of the first low-resolution image;
- encoding the first low-resolution image to obtain a first bitstream;
- obtaining a second high-resolution image, wherein third resolution of the second high-resolution image is higher than the second resolution, and the second high-resolution image comprises high-frequency information of the first high-resolution image and excludes low-frequency information of the first high-resolution image;
- obtaining an image residual between the first high-resolution image and the second high-resolution image, wherein the image residual is used to reflect the low-frequency information;
- encoding the image residual to obtain a second bitstream; and
- sending the first bitstream and the second bitstream.

13. The transmission apparatus according to claim 12, wherein the high-frequency information is image detail information and the low-frequency information is image outline information.

14. The transmission apparatus according to claim 12, wherein the obtaining a second high-resolution image comprises:
- decoding the first bitstream to obtain a second low-resolution image; and
- reconstructing the second high-resolution image by using the second low-resolution image.

15. The transmission apparatus according to claim 14, wherein the reconstructing the second high-resolution image by using the second low-resolution image comprises:
- reconstructing the second high-resolution image by using the second low-resolution image and a neural network.

16. The transmission apparatus according to claim 12, wherein the first resolution and the third resolution are the same; and the obtaining an image residual between the first high-resolution image and the second high-resolution image comprises:
- subtracting a pixel value of a first pixel in the first high-resolution image from a pixel value of a second pixel in the second high-resolution image corresponding to the first pixel, to obtain a first pixel residual in the image residual.

17. A transmission apparatus, wherein the apparatus comprises: a processor system and a memory, wherein the memory is configured to store computer executable program code, and the program code includes instructions executed by the processor system to enable the transmission device to perform an image transmission method, comprising:
- receiving a first bitstream and a second bitstream;
- decoding the first bitstream to obtain a second low-resolution image;
- reconstructing a second high-resolution image by using the second low-resolution image, wherein first resolution of the second high-resolution image is higher than second resolution of the second low-resolution image, and the second high-resolution image comprises high-frequency information of a first high-resolution image and excludes low-frequency information of the first high-resolution image;
- decoding the second bitstream to obtain an image residual between the first high-resolution image and the second high-resolution image, wherein the image residual is used to reflect the low-frequency information; and
- combining the second high-resolution image and the image residual to obtain a third high-resolution image.

18. The transmission apparatus according to claim 17, wherein the high-frequency information is image detail information and the low-frequency information is image outline information.

19. The transmission apparatus according to claim 17, wherein the reconstructing a second high-resolution image by using the second low-resolution image comprises:
- reconstructing the second high-resolution image by using the second low-resolution image and a neural network.

20. The transmission apparatus according to claim 17, wherein the combining the second high-resolution image and the image residual to obtain a third high-resolution image comprises:
- adding a pixel value of a second pixel in the second high-resolution image to a pixel residual in the image residual corresponding to the second pixel, to obtain a third pixel in the third high-resolution image corresponding to the second pixel.

* * * * *